(12) United States Patent
He et al.

(10) Patent No.: US 11,223,401 B2
(45) Date of Patent: Jan. 11, 2022

(54) TECHNIQUE FOR SELECTING A MIMO TRANSPORT FORMAT

(71) Applicant: Telefonaktiebolaget LM Ericsson (publ), Stockholm (SE)

(72) Inventors: Anqi He, Beijing (CN); Virgile Garcia, Antibes (FR)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 17/253,917

(22) PCT Filed: Mar. 14, 2019

(86) PCT No.: PCT/EP2019/056492
§ 371 (c)(1),
(2) Date: Dec. 18, 2020

(87) PCT Pub. No.: WO2019/242898
PCT Pub. Date: Dec. 26, 2019

(65) Prior Publication Data
US 2021/0273695 A1 Sep. 2, 2021

(30) Foreign Application Priority Data
Jun. 19, 2018 (WO) ................ PCT/CN2018/091779

(51) Int. Cl.
*H04B 7/04* (2017.01)
*H04B 7/0456* (2017.01)
(Continued)

(52) U.S. Cl.
CPC ......... *H04B 7/0486* (2013.01); *H04B 7/0626* (2013.01); *H04L 1/0006* (2013.01); *H04L 1/0026* (2013.01)

(58) Field of Classification Search
CPC ... H04B 7/0486; H04B 7/0626; H04L 1/0006; H04L 1/0026
See application file for complete search history.

(56) References Cited

U.S. PATENT DOCUMENTS 9,918,240 B2 3/2018 Lee et al.
10,784,939 B2 * 9/2020 Kim ..................... H04B 7/0626
(Continued)

OTHER PUBLICATIONS

International Search Report and Written Opinion of the International Searching Authority, PCT/EP2019/056492, dated Jun. 19, 2019, 12 pages.
(Continued)

*Primary Examiner* — Freshteh N Aghdam
(74) *Attorney, Agent, or Firm* — Sage Patent Group

(57) ABSTRACT

A technique for selecting a transport format for a multiple-input multiple-output, MIMO, channel between a first station and a second station is described. The first station comprises M first antenna ports, wherein M≥2. The second station comprises N second antenna ports, wherein N≥2. As to a method aspect of the technique, a channel estimation is performed based on reference signals received at the M first antenna ports from a subset comprising $X_0$ second antenna ports among the N second antenna ports, wherein $1 \leq X_0 < N \leq M$. The channel estimation results in a partial channel state relating to the $X_0$ second antenna ports to the M first antenna ports. At least one extended channel state is constructed based on the partial channel state.

19 Claims, 15 Drawing Sheets

(51) Int. Cl.
    *H04B 7/06*      (2006.01)
    *H04L 1/00*      (2006.01)

(56)            References Cited

U.S. PATENT DOCUMENTS

| | | | |
|---|---|---|---|
| 2015/0009836 A1 | 1/2015 | Tujkovic et al. | |
| 2017/0063503 A1* | 3/2017 | Liu | H04L 5/0051 |
| 2018/0278312 A1* | 9/2018 | Frenne | H04L 1/0023 |
| 2018/0316405 A1* | 11/2018 | Li | H04B 7/0626 |
| 2019/0097693 A1* | 3/2019 | Park | H04L 5/0023 |

OTHER PUBLICATIONS

3GPP TSG-RAN, $3^{rd}$ Generation Partnership Project, Working Group 4 (Radio), Meeting #49bis, R4-090275, "Static CSI Requirements for PUCCH 1-1", Ljubljana, Slovenia, Jan. 12-16, 2009, (XP050326758) 3 pages.

* cited by examiner

100

200

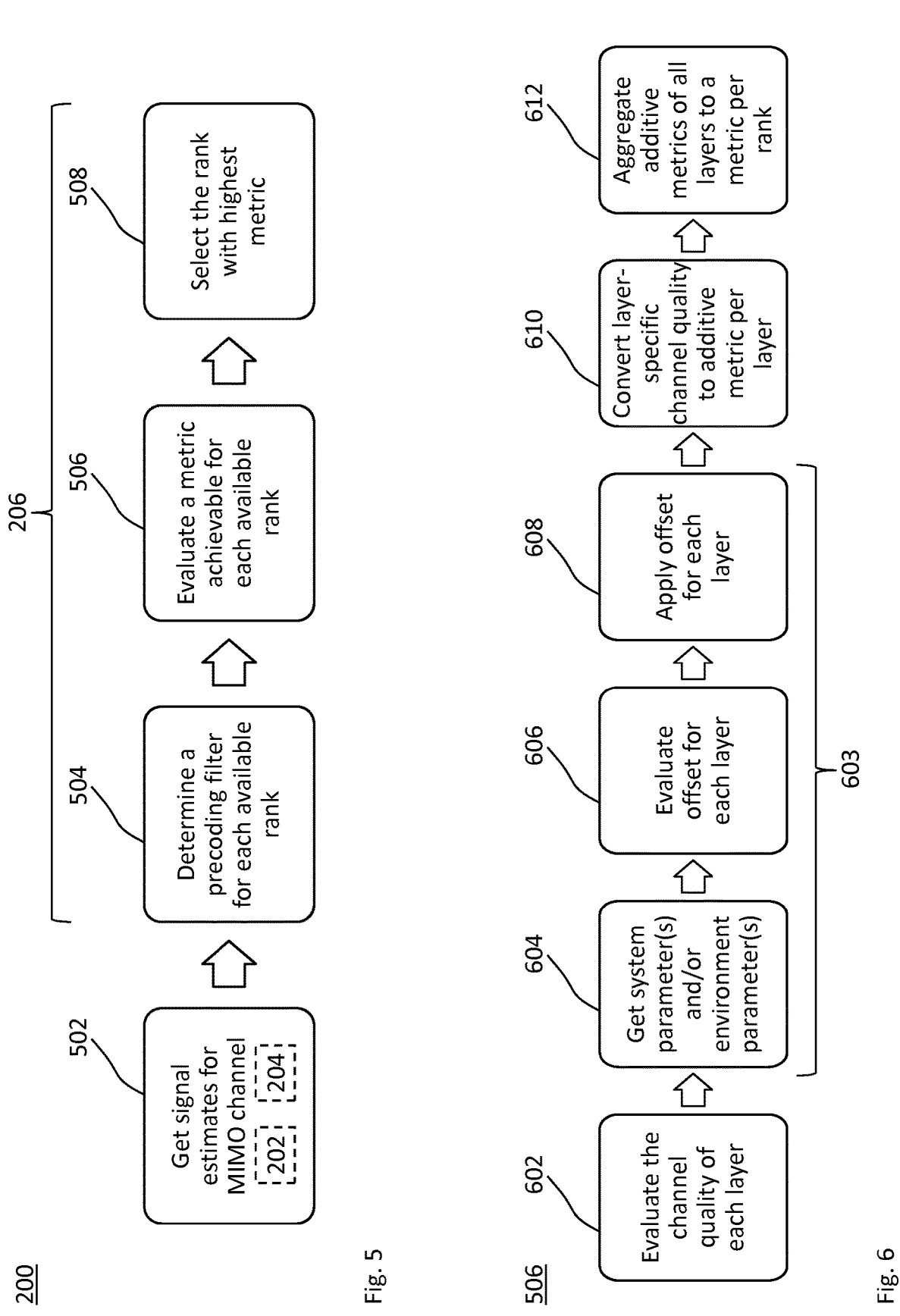

TECHNIQUE FOR SELECTING A MIMO TRANSPORT FORMAT

CROSS REFERENCE TO RELATED APPLICATIONS

This application is a 35 U.S.C. § 371 national stage application of PCT International Application No. PCT/EP2019/056492 filed on Mar. 14, 2019, which in turn claims priority to PCT International Application No. PCT/CN2018/091779 filed on Jun. 19, 2018, the disclosures and content of which are incorporated by reference herein in their entirety.

TECHNICAL FIELD

The present disclosure generally relates to a multiple-input multiple-output (MIMO) radio communications. More specifically, a method and a device are provided for selecting a transport format for a MIMO channel.

BACKGROUND

Modern radio communication systems provide ubiquitous coverage at high data rates, particularly in areas with a high density of user equipments (UEs). This requires efficient usage of radio resources by means of multiple-input multiple-output (MIMO) channels, for example multi-user MIMO (MU-MIMO) transmissions and transmit beamforming. MIMO channels use more antenna elements at both the transmitter and the receiver of the radio communication as compared to an omnidirectional or directionally uncontrolled radio communication.

A MIMO channel can exploit spatial degrees of freedom offered by multipath propagation, including multipath fading inside the MIMO channel, in order to substantially increase data rates and reliability of the radio communication. The Third Generation Partnership Project (3GPP) defines MIMO channels in current and future releases of Long Term Evolution (LTE) and New Radio (NR).

A data transmission on the MIMO channel requires the transmitter, e.g., a radio base station (RBS) such as a 3GPP evolved Node B (eNB), to know the channel state (also: channel conditions) of the MIMO channel. All available combinations of the antenna elements are predefined in the codebook. That is, the codebook-based MIMO channel uses a standardized set of available precoding vectors. Each precoding vector comprises weightings (also: antenna element gains) for each of the antenna elements. The transmitter transmits training sequences (also: reference signals) that are measured by the receiver (e.g., a UE). The receiver knows the codebook prior to the data transmission. Based on the reference signal measurement, the receiver estimates a channel gain for each precoding vector and feedbacks information indicative of the precoding vectors or the channel gains to the transmitter. The transmitter uses the feedback information, e.g., a precoding matrix indicator (PMI), to determine which precoding vectors to use when transmitting the data.

When using such a codebook-based MIMO channel, the receiver with two or more antenna elements can measure the reference signals on each of its antenna elements and decide or inform the transmitter as to the precoding vectors that optimizes the reception at the receiver. However, the codebook-based MIMO channel is by design limited to the set of available precoding vectors represented in the codebook and known to the receivers. Moreover, the greater the codebook, the more detailed is the feedback information, and thus the greater is the signaling overhead.

Another approach to receiver-specific precoding that avoids the limitations and signaling overhead of the codebook-based MIMO channel utilizes reciprocity of the MIMO channel, e.g., assuming that the channel state for a downlink (DL) channel is identical to the channel state for an uplink (UL) channel. Reciprocity can be utilized in time division duplexing (TDD) systems that transmit both UL and DL on the same frequency, i.e., time-duplexed. The receiver (e.g., a UE) sends sounding sequences (also referred to as sounding reference signals, SRS, particularly in LTE and NR) to the transmitter (e.g., a RBS) that measures these to estimate the channel state. Such a direct measurement gives the transmitter more detailed information as to the channel state than what is implicitly obtained through feedback information referring to a codebook. The more detailed channel state allows for more exotic DL precoding vectors as compared to the codebook-based precoding and is not limited to a predefined subset of precoding vectors. Hence, the order of spatial multiplexing (also: rank or number of layers) and throughput rate are potentially higher for a reciprocity-based MIMO channel than a codebook-based MIMO channel.

The channel state has to relate all antenna elements the receiver utilizes for data reception to all antenna elements the transmitter utilizes for data transmission. Hence, in order to estimate the channel state based on reciprocity, the receiver has to transmit reference signals on each of its antenna elements. Modern UEs utilize two or more antennas for data reception and, hence, support a 2-layer MIMO channel in the DL. However, even some modern UEs utilize only one antenna element for the transmission in the UL. A reason for this is that for a fixed transmit power, e.g., limited by regulations, the transmit power per antenna would be lower, which would decrease UL coverage. The lower number of transmit antenna elements compared to the number of receive antenna elements at the UE limits the channel estimation based on reciprocity. The result is that the RBS only has a partial channel state available for DL transmissions.

A full channel state may be constructed from the partial channel state, which is also referred to as channel reconstruction. However, since the constructed channel state is not estimated by measuring all layers, a MIMO channel that is based on the constructed channel state can entail failures when adapting a transport format for the MIMO channel such as rank adaptation and link adaptation.

SUMMARY

Accordingly, there is a need for a technique that determines a transport format based on a partial knowledge of a channel state.

An alternative or further object is to determine the transport format for a MIMO channel that is based on a constructed channel state.

As to one aspect, a method of selecting a transport format for a multiple-input multiple-output (MIMO) channel is provided. The MIMO channel is between a first station comprising M first antenna ports and a second station comprising N second antenna ports, wherein $M \geq 2$ and $N \geq 2$. The method may comprise or initiate a step of performing a channel estimation based on reference signals received at the M first antenna ports from a subset comprising $X_0$ second antenna ports among the N second antenna ports, wherein $1 \leq X_0 < N \leq M$. The channel estimation may result in a partial channel state relating the $X_0$ second antenna ports to the M first antenna ports. The method may further comprise or initiate a step of constructing at least one extended channel state based on the partial channel state. The i-th extended channel state may relate $X_i$ second antenna ports among the N second antenna ports to the M first antenna ports, wherein $i \geq 1$ and $X_0 < X_i \leq N$. The method may further comprise or initiate a step of selecting the transport format. The selection may depend on a metric evaluated for each of the partial channel state and the at least one extended channel state.

The selection of the transport format depending on a metric evaluated for the partial channel state and evaluated for the at least one extended channel state can enable at least some embodiments to switch to a higher rank of the MIMO channel according to the extended channel state and/or to switch to a lower rank of the MIMO channel according to the partial channel state. In contrast, a conventional rank adaptation may overestimate the channel capacity of a MIMO channel based on a constructed channel state and may, thus, fail to switch to a lower rank.

Same or further embodiments can improve reliability and/or throughput of a data transmission on the MIMO channel using the selected transport format. For example, the metric may compensate for an overestimation of the channel quality of layers based on the extended channel state. Based on the metric, the selection of the transport format can improve or replace a link adaptation, a rank adaptation and/or scheduling in same or further embodiments.

Each of the first and second antenna ports may correspond to an antenna or an antenna element (e.g., an antenna element of an antenna array) at the first and second stations, respectively.

Herein, the "MIMO channel" may be an umbrella term encompassing one or more multi-user MIMO (MU-MIMO) channels (e.g., from the perspective of the first station, wherein the second station corresponds to one of the multiple users), one or more precoded channels (e.g., by transmit precoding and/or receive precoding) and one or more multiple-input single-output (MISO) channels. The precoding at the first station (e.g., the transmit precoding or the receive precoding) may be specific for the second station. When the selected transport format comprises or implies a rank equal to one, the MIMO channel may be used (e.g., temporarily) as a MISO channel.

Herein, the expressions "extended channel state", "constructed channel state" and "constructed extended channel state" may be synonymous.

The estimated partial channel state and the constructed extended channel state may also be referred to as the at least two channel states. Herein, the partial channel state may also be referred to as the 0-th channel state (e.g., as a convenient or compact notation). Each of the at least two channel states may also be referred to as the i-th channel state for an $i \geq 0$. The selecting of the transport format may comprise the evaluation of the metric for each of the at least two channel states (i.e., for each of the partial channel state and the at least one extended channel state).

The metric evaluated for each of the at least two channel states may be indicative of a performance (e.g., a data rate or data throughput) that is achievable by a precoder determined based on the respective channel state. The evaluation of the metric may comprise a correction (e.g., an offset) that takes into account that the performance achievable by the at least one extended channel state is less than the performance achievable by a hypothetical precoder based on a channel state measured for the same rank (e.g., based on a full knowledge of the channel state) of the MIMO channel.

The $X_i$ second antenna ports of the i-th extended channel state for $i \geq 1$ may comprise the $X_0$ second antenna ports of the partial channel state for each of the at least one extended channel state. For example, the subset comprising the $X_{i-1}$ second antenna ports may be a (e.g., proper) subset of the subset comprising the $X_i$ second antenna ports for each $i=1, \ldots, c$, wherein c is the number of the at least two channel states. The step of constructing may comprise constructing $c-1$ extended channel states.

The i-th channel state ($i=1, \ldots, c$) of the at least two channel states ($c \geq 2$) may correspond to or may be represented by a channel matrix. The channel matrix of the i-th channel state may relate the $X_i$ second antenna ports to the M first antenna ports. A size of the channel matrix of the i-th channel state may be $M \times X_i$. The transpose or complex-conjugate of the channel matrix may correspond to or may represent the reciprocal channel (e.g., the DL if the channel matrix corresponds to the UL).

The at least two channel states may also be referred to as, or may be represented by, channel state information (CSI). This CSI may or may not be related to CSI (e.g., in a CSI report) defined by 3GPP.

The method may be performed by the first station. The first station may be a radio node providing radio access to the second station. The radio node may be a radio base station (RBS) or an access point (AP). A radio access network (RAN) may comprise one or more embodiments of the first station. The technique may be implemented in the downlink (DL). The second station may be configured to radio-access the first station, e.g., the RAN. The second station may also be referred to as a radio device, e.g., a user equipment (UE).

Since the first station may use the selected transport format for a transmission to the second station, the first station may also be referred to as a transmitter. The second station may also be referred to as a receiver. For example, the transmit precoding may be receiver-specific.

The MIMO channel or the at least two first antenna ports may be utilized for at least one of spatial diversity, spatial multiplexing and transmit beamforming.

The gains from both diversity, multiplexing as well as beamforming depends on how well the transmitting antenna system knows the spatial nature of the channel, and hence its ability of direct the energy to the target users, and how well it avoids emitting energy to the interfered users.

Since the MIMO channel (more specifically, the precoder) at the first station is determined based on the partial channel state, which in turn is estimated based on the reference signals received from the second station, the MIMO channel may also be referred to as a reciprocity-based MIMO channel.

The technique may be implemented as a method of transport format selection for reconstructed MIMO channels. The transport format may also be referred to as a physical radio communication scheme. Herein, the transport format may encompass any physical radio communication scheme that is used for a certain physical channel. Alternatively or in addition, the method or at least the selecting step may be implemented by a medium access control (MAC) entity that performs a transport format selection and/or maps transport channels to physical channels.

The metric may depend on at least one of the transport format and a radio propagation environment of the MIMO channel.

The radio propagation environment may be represented by one or more environment parameters. The one or more environment parameters may be measured and/or received in a report. For example, the one or more environment parameters may be measured at the second station and/or reported from the second station. The environment parameters may comprise at least one of a signal to interference plus noise ratio (SINR), a signal to noise ratio (SNR) and/or a channel quality index (CQI).

The construction of the at least one extended channel state may be independent of the radio propagation environment. For example, the construction of the at least one extended channel state may depend only on the partial channel state according to a constructing type.

Furthermore, a derivation of a precoder from the respective channel state (e.g., for each of the at least two channel states) may be independent of the radio propagation environment (e.g., independent of the one or more environment parameters). For example, the derivation of the precoder may depend only on the respective channel state according to a precoding type.

Each of the partial channel state and the at least one extended channel state may define and/or limit the transport format. The transport format may comprise one or more transmission parameters. The one or more transmission parameters may also be referred to as radio communication parameters. In the evaluation of the metric for each of the at least two channel states (i.e., the partial channel state and the at least one extended channel state), the respective channel state may define or limit at least one of the transmission parameters. For example, the transport format may comprise a number of r layers (i.e., a rank, r, of the radio communication using the MIMO channel), and the i-th channel state, $i \geq 0$, among the at least two channel states may relate to $X_i$ second antenna ports, wherein the respective channel state may define the rank (e.g., $r=X_i$) or may limit the rank (e.g., $r \leq X_i$).

The method may further comprise or initiate a step of transmitting data from the first station to the second station using the selected transport format. The one or more transmission parameters of the transport format may be used for the radio transmission of the data from the first station to the second station.

The transmission parameters may comprise one or more system parameters, e.g., for a system comprising the M first antennas and/or the first station. The transmission parameters may also be referred to as control parameters, e.g., for controlling the radio transmission from the M first antennas on the MIMO channel.

The transport format may comprise a rank of the MIMO channel. The rank of the selected transport format may be the rank selected and/or used for at least one of the MIMO channel and the transmission of the data. The step of selecting the transport format may comprise selecting the rank r for the MIMO channel and/or the transmission of the data.

Alternatively or in combination, the step of selecting the transport format may comprise selecting one of the channel states among the partial channel state and the at least one extended channel state. Each of the at least two channel states (i.e., the partial channel state and the at least one extended channel state) may correspond to a rank. Each of the at least two channel states may correspond to a different rank.

The metric may comprise at least one of a mutual information for the MIMO channel, a channel capacity for the MIMO channel and a data rate (also: data throughput) for the MIMO channel. The metric evaluated for each of the at least two channel states may be indicative of the performance achievable when a precoder derived from the respective channel state is used for a transmission on the MIMO channel and/or the transmission on the MIMO channel uses the respective transport format.

The partial channel state may correspond to a rank $r_0$, wherein $r_i \leq X_i$ for $i=0$. Each of the at least one extended channel state may correspond to a rank $r_i$, wherein $r_1 \leq X_i$ for $i \geq 1$.

The evaluation of the metric for each of the at least two channel states (i.e., for each of the partial channel state and the at least one extended channel state) may assume a rank $r_i \leq X_i$ (preferably, $r_i = X_i$) for the respective i-th channel state, e.g., for each $i \geq 0$. Selecting the transport format depending on the metric (i.e., the evaluated metric resulting from the evaluation of the metric for each of the at least two channel states) may comprise selecting the rank $r_i$ of the corresponding one of the at least two channel states.

The selection of the transport format may comprise a step of determining, for each of the partial channel state and the at least one extended channel state, at least one precoder. Each of the precoders may comprise $r_i$ layers (e.g., $r_i$ precoding vectors). The precoders may define $r_i$ layers of the MIMO channel. The number $r_i$ may also be referred to as the rank of the respective precoder.

Each of the layers may correspond to a linear combination of the M first antenna ports. Each linear combination may comprise a complex-valued gain for each of the M first antennas. Each linear combination may be represented by a precoding vector, e.g., a precoding vector $t_k$ for $k=1, \ldots, r_i$. The index k may be indicative of the k-th layer among the $r_i$ layers. The precoder of rank $r_i$ may correspond to a set of $r_i$ precoding vectors, which may be represented by columns of a precoding matrix $T=[t_1, \ldots t_{r_i}]$.

The evaluation of the metric may comprise a step of evaluating a channel quality for each of the layers. For example, the determination of the precoder may imply determining the channel quality for each of the layers. The channel quality for each layer may be a set of parameters for the determination of the precoder. The precoder may be determined by maximizing or minimizing a function of the channel qualities of all layers of the precoder.

The evaluation of the metric, e.g., for each of the at least one extended channel state, may further comprises a step of offsetting the evaluated channel quality for at least one or each of the layers by an offset. The offset may also be referred to as a bias or penalty.

The step of offsetting may comprise subtracting the offset from or adding the offset to the evaluated channel quality, which may also be referred to as applying the offset. The offset may be applied only in the evaluation of the metric for the at least one extended channel state. For example, no offset is applied in the evaluation of the metric for the partial channel state.

The offset for the at least one or each of the layers of the respective precoder may depend on the radio propagation environment of the MIMO channel. For example, the offset in a radio propagation environment with line-of-sight propagation for the MIMO channel may be less than the offset in a radio propagation environment with multi-path propagation and/or multi-scattering propagation for the MIMO channel.

The offsets for different layers of the same precoder may be different. The offset may be layer-specific. The offset may be computed and/or applied for each of the layers.

The channel quality may comprise at least one of a signal to noise ratio (SNR) of the respective layer and a signal to interference plus noise ratio (SINR) of the respective layer. The SINR may also be referred to as signal to noise and interference ratio. The channel quality may refer to levels of the signal, the noise and/or the interference as measured at the second station and/or reported from the second station.

The evaluation of the metric may further comprise a step of converting the offset channel quality for each of the layers to an additive metric for each of the layers. The additive metric for each of the layers may also be referred to as layer-specific metric.

The additive metric may comprise at least one of a mutual information of the respective layer, a channel capacity of the respective layer and a mean data rate of the respective layer. For example, the additive metric, $c_{k,i}$, for the k-th layer of the i-th channel state and/or the i-th precoder may be equal to $c_{k,i}=\log(1+p_{k,i})$ or a linear function thereof, wherein $p_{k,i}$ is the channel quality of the respective layer.

The evaluation of the metric may further comprise a step of aggregating, for each of the precoders, the additive metrics for the layers of the respective precoder. The aggregation of the addictive metrics for the layers of the respective precoder may result in the evaluated metric for the respective precoder, for the respective channel state and/or for the respective rank. For example, one precoder may be determined for each of the at least two channel states, and the aggregation may result in a corresponding one metric for each of the at least two channel states. If more than one precoder is evaluated for each of the at least two channel states, the aggregation may result in a corresponding number of evaluated metrics for each of the at least two channel states.

Each of the precoders may be determined based on the respective channel state according to a precoding type. The offset for the at least one or each of the layers of the respective precoder may depend on the precoding type. The precoding type may comprise at least one of a matched filter (MF), a singular value decomposition (SVD), an eigenvalue-based beamforming (EBB), a maximum ratio transmission (MRT), a zero-forcing (ZF) filter, and a Wiener filter (WF).

The precoding may be linear. The linear precoding may use as the precoding type at least one of MRT precoding (e.g., in a noise-limited system), ZF precoding (e.g., if the system is interference-limited) and transmit Wiener precoding or WF precoding. The MF precoding may result from a maximization of a receive SNR, e.g., the SNR at the second station. The ZF precoding may result from suppressing (e.g., eliminating or minimizing) interference between the different layers. The WF precoding may result from minimize the mean square error (MSE). The WF precoding may also be referred to as MMSE precoding. Alternatively or in addition, the precoding may be non-linear. The non-linear precoding may use as the precoding type a dirty paper coding (DPC), also referred to as Costa precoding.

Alternatively or in addition, the at least one extended channel state may be constructed according to a constructing type. The metric may depend on the constructing type. For example, each of the at least one extended channel state may be constructed according to the constructing type. The offsets for the layers may be determined for the respective extended channel state depending on the constructing type. Different extended channel states may be constructed according to different constructing types.

The metric may depend on one or more system parameters. The offsets for the layers may be determined for the respective extended channel state depending on the one or more system parameters. The system parameters may comprise the number of the M first antenna ports. For example, the offsets for the layers may be determined for the respective extended channel state depending on the number M of first antenna ports.

As to another aspect, a computer program product is provided. The computer program product comprises program code portions for performing any one of the steps of the one aspect disclosed herein when the computer program product is executed by one or more computing devices. The computer program product may be stored on a computer-readable recording medium. The computer program product may also be provided for download via a data network, the Internet, the first station and/or the second station. Alternatively or in addition, the method may be encoded in a Field-Programmable Gate Array (FPGA) and/or an Application-Specific Integrated Circuit (ASIC), or the functionality may be provided for download by means of a hardware description language.

As to one device aspect, a device for selecting a transport format for a MIMO channel is provided. The MIMO channel may be between a first station comprising M first antenna ports and a second station comprising N second antenna ports, wherein M≥2 and N≥2. The device may be configured to perform the one aspect. Alternatively or in addition, the device may comprise a channel estimation unit configured to performing a channel estimation based on reference signals received at the M first antenna ports from a subset comprising $X_0$ second antenna ports among the N second antenna ports, wherein $1 \leq X_0 < N \leq M$. The channel estimation may result in a partial channel state relating the $X_0$ second antenna ports to the M first antenna ports. The device may further comprise a constructing unit configured to construct at least one extended channel state based on the partial channel state. The i-th extended channel state may relate $X_i$ second antenna ports among the N second antenna ports to the M first antenna ports, wherein i≥1 and $X_0 < X_i \leq N$. The device may further comprise a selecting unit configured to select the transport format, wherein the selection depends on a metric evaluated for each of the partial channel state and the at least one extended channel state.

As to another device aspect, a device for selecting a transport format for a MIMO channel is provided. The MIMO channel may be between a first station comprising M first antenna ports and a second station comprising N second antenna ports, wherein M≥2 and N≥2. The device may comprise at least one processor and a memory. Said memory may comprise instructions executable by said at least one processor whereby the device is operative to performing a channel estimation based on reference signals received at the M first antenna ports from a subset comprising $X_0$ second antenna ports among the N second antenna ports, wherein $1 \leq X_0 < N \leq M$. The channel estimation may result in a partial channel state relating the $X_0$ second antenna ports to the M first antenna ports. Execution of the instructions may further cause the device to be operative to constructing at least one extended channel state based on the partial channel state. The i-th extended channel state may relate $X_i$ second antenna ports among the N second antenna ports to the M first antenna ports, wherein i≥1 and $X_0 < X_i \leq N$. Execution of the instructions may further cause the device to be operative to selecting the transport format, wherein the selection depends on a metric evaluated for each of the partial channel state and the at least one extended channel state.

As to a further aspect, a radio base station (RBS) configured to communicate with a radio device (e.g., a user equipment or UE) is provided. The RBS may comprise at least one of a radio interface, a backbone interface (e.g., according to the 3GPP X2 interface or 3GPP Xn interface) and a processing circuitry configured to execute any one of the steps of the one aspect.

As to a still further aspect a communication system including a host computer is provided. The host computer may comprise a processing circuitry configured to provide user data. The host computer may further comprise a communication interface configured to forward user data to a cellular network for transmission to a user equipment (UE). The UE may comprise at least one of a radio interface and processing circuitry.

The communication system may further include the UE. Alternatively or in addition, the cellular network may further include a RBS configured to communicate with the UE and/or according to the further aspect.

The processing circuitry of the host computer may be configured to execute a host application, thereby providing the user data. Alternatively or in addition, the processing circuitry of the UE may be configured to execute a client application associated with the host application.

As to a still further aspect a method implemented in a RBS is provided. The method may comprise any of the steps of the one aspect.

The device, the RBS, the communication system or any node or station for embodying the technique may further include any feature disclosed in the context of the one aspect, and vice versa. Particularly, any one of the units and modules, or a dedicated unit or module, may be configured to perform or trigger one or more of the steps of the one aspect.

BRIEF DESCRIPTION OF THE DRAWINGS

Further details of embodiments of the technique are described with reference to the enclosed drawings, wherein:

FIG. 5 shows a flowchart for an exemplary implementation of the method of FIG. 2;

FIG. 6 schematically illustrates exemplary steps of evaluating a metric, which steps may be implementable in any embodiment of the device of FIG. 1 or implementation of the method of FIG. 2;

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a New Radio (NR) or 5G implementation, it is readily apparent that the technique described herein may also be implemented in any other radio network, including 3GPP LTE or a successor thereof and/or Wireless Local Area Network (WLAN) according to the standard family IEEE 802.11 (Wi-Fi).

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising at least one computer processor and memory coupled to the at least one processor, wherein the memory is encoded with one or more programs that may perform the functions and steps or implement the units and modules disclosed herein.

Figure 1:
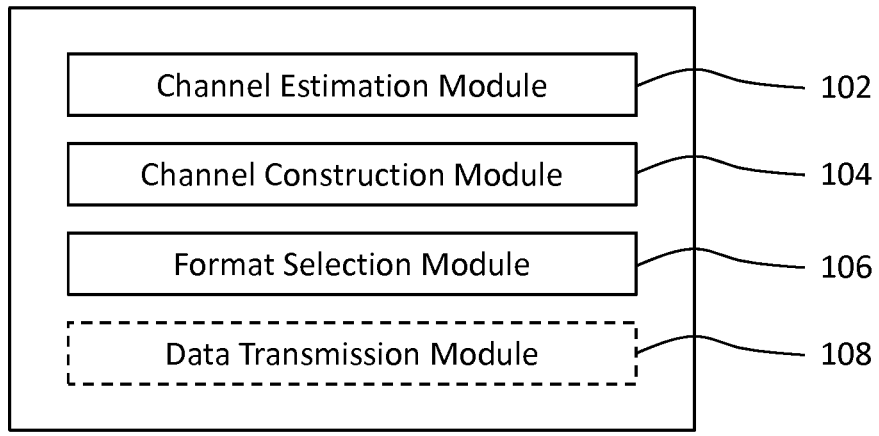
FIG. 1 shows a schematic block diagram of an embodiment of a device for selecting a transport format for a MIMO channel.

FIG. 1 schematically illustrates a block diagram of an embodiment of a device for selecting a transport format for a multiple-input multiple-output (MIMO) channel between a first station and a second station. The first station comprises M first antenna ports (e.g., first antenna elements), wherein M≥2. The second station comprises N second antenna ports (e.g., second antenna elements), wherein N≥2 and N≤M. The device is generically referred to by reference sign 100.

A channel estimation module 102 of the device 100 performs a channel estimation based on reference signals received at the M first antenna ports from a subset comprising at least one second antenna ports among the N second antenna ports. The number of second antenna ports from which the reference signals are received is denoted by $X_0$. The subset is a proper subset, i.e., $X_0<N$. Based on the received reference signals, the channel estimation module 102 determines a partial channel state relating the $X_0$ second antenna ports to the M first antenna ports.

A channel construction module 104 of the device 100 constructs at least one extended channel state based on the partial channel state. The i-th (e.g., the first and only) extended channel state relates $X_i$ (e.g., $X_1$) second antenna ports among the N second antenna ports to the M first antenna ports, wherein i≥1 and $X_0<X_i≤N$. One (e.g., the only one) extended channel state may be a full channel state, i.e. $X_i=N$.

A format selection module 106 of the device 100 selects the transport format. The selection depends on a metric evaluated for each of the partial channel state and the at least one extended channel state.

An optional data transmission module 108 transmits data, or initiates the transmission of data, from the first station to the second station using the selected transport format. Alternatively or in addition, the device 100 comprises a data reception module that receives data, or initiates the reception of data, from the second station at the first station using the selected transport format.

Any of the modules of the device 100 may be implemented by units configured to provide the corresponding functionality.

The device 100 may be embodied by or at the first station and/or a radio base station (RBS), e.g., of a radio access network (RAN).

In one variant, the device 100 may be part of the RAN, one or more nodes connected to the RAN for controlling a RBS, or a combination thereof. In another variant, which is combinable with the one variant, the device 100 or one or more of the modules 102 to 108 may be part of a core network connected to the RAN. For example, the device 100 or one or more of the modules may be embodied by a mobility management entity (MME) or by an access and mobility function (AMF).

In any variant, the second station may be a radio device, e.g., a wireless or mobile device.

Figure 2:
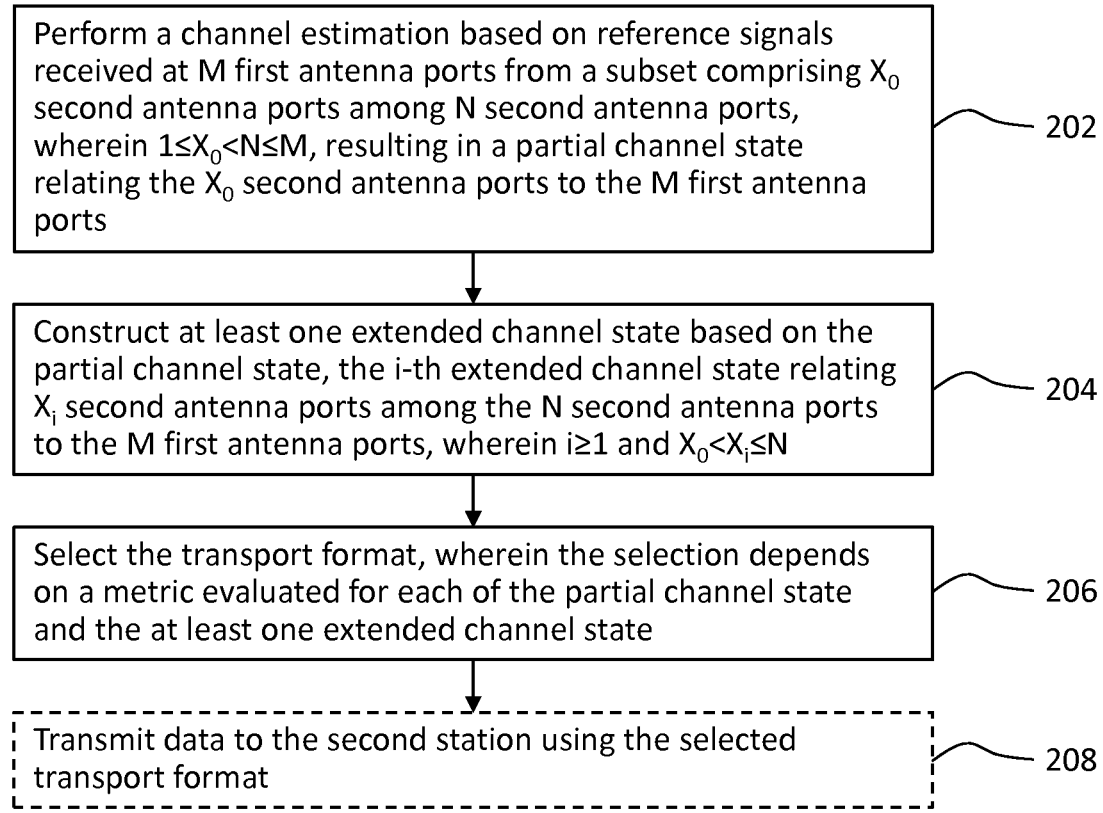
FIG. 2 shows a flowchart for an implementation of a method of selecting a transport format for a MIMO channel, which method may be implementable by the device of FIG. 1.

FIG. 2 shows a flowchart for a method 200 of selecting a transport format for a MIMO channel between a first station comprising M first antenna ports and a second station comprising N second antenna ports, wherein M≥2 and N≥2. The method 200 comprises a step 202 of performing a channel estimation based on reference signals received at the M first antenna ports from a subset comprising $X_0$ second antenna ports among the N second antenna ports, wherein $1≤X_0<N≤M$. The step 202 results in a partial channel state relating the $X_0$ second antenna ports to the M first antenna ports.

The method 200 further comprises a step 204 of constructing at least one extended channel state based on the partial channel state. The i-th extended channel state relates $X_i$ second antenna ports among the N second antenna ports to the M first antenna ports, wherein i≥1 and $X_0<X_i≤N$. In a step 206, the transport format is selected. The selection depends on a metric evaluated for each of the partial channel state and the at least one extended channel state.

Optionally, the first station transmits data to and/or receives data from the second station in a step 208.

The method 200 may be performed by the device 100, e.g., at or using the first station and/or the RBS. For example, the modules 102, 104 and 106 may perform the steps 202, 204 and 206, respectively.

In a RAN comprising a plurality of RBSs, the method 200 may be implemented by at least one or each of the RBSs.

The reference signal (RS) may comprise at least one of a demodulation (DMRS), a phase-tracking reference signal (PT-RS), a channel state information RS (CSI-RS), a sounding RS (SRS) and a synchronization signal (SS). The RS may be, or may be comprised in, a SS block (SSB).

The transport format may fulfill or comply with a radio access technology (RAT), e.g., according to 3GPP. The RAT may comprise at least one of the Global System for Mobile Communications (GSM), the Universal Mobile Telecommunications System (UMTS), Long Term Evolution (LTE), particularly Evolved Universal Terrestrial Radio Access (E-UTRA), MulteFire, New Radio (NR) and/or Wi-Fi. NR may encompass any RAT for 5th generation (5G) mobile networks, particularly non-standalone NR (NSA NR).

Herein, a RBS may encompass any node that is configured to provide radio access to the radio device. The expression "node" may be synonymous with the expression RBS. Any RBS may serve a plurality of radio devices. Examples for the RBS may include a 3G base station or Node B, 4G base station or eNodeB, a 5G base station or gNodeB and an access point (e.g., a Wi-Fi access point).

The technique may be implemented on a Physical Layer (PHY), a Medium Access Control (MAC) layer, a Radio Link Control (RLC) layer and/or a Radio Resource Control (RRC) layer of a protocol stack of the RAT.

In the one or the other variant, the radio device may be configured for accessing the RBS or the RAN (e.g. on an uplink and/or a downlink). In a further variant, which may be combinable with the afore-mentioned variants, each of the first station and the second station is embodied by a radio device, which may be configured for peer-to-peer communication with the respectively other radio device (e.g., on a sidelink).

In any variant, the radio device may be a user equipment (UE, e.g., a 3GPP UE), a mobile or portable station (STA, e.g. a Wi-Fi STA), a device for machine-type communication (MTC), a device for narrowband Internet of Things (NB-IoT) or a combination thereof. Examples for the UE and the mobile station include a mobile phone and a tablet computer. Examples for the portable station include a laptop computer and a television set. Examples for the MTC device or the NB-IoT device include robots, sensors and/or actuators, e.g., in manufacturing, automotive communication and home automation. The MTC device or the NB-IoT device may be implemented in household appliances and consumer electronics. Examples for the combination include a self-driving vehicle.

Figure 3:
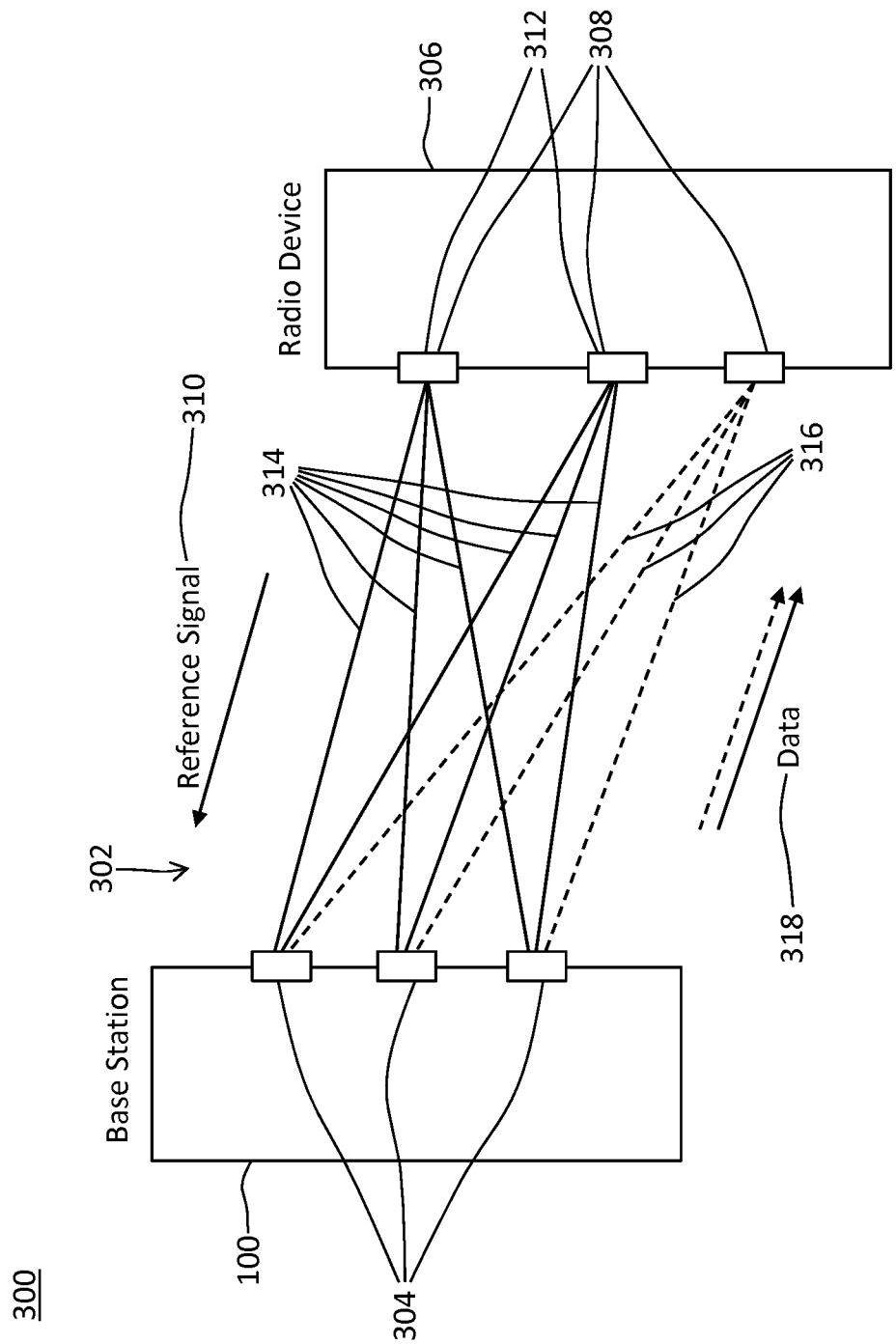
FIG. 3 schematically illustrates an embodiment of a communication system comprising an embodiment of the device of FIG. 1.

FIG. 3 schematically illustrates an example of a communication system comprising an embodiment of the device 100 as the first station. For example, the first station 100 is embodied by a RBS. A radio device, e.g., a UE, may embody the second station 306.

At the first station 100, the MIMO channel 302 comprises M first antenna ports 304. At the second station 306, the MIMO channel 302 comprises N second antenna ports 308.

In the step 202, the reference signals (RSs) 310 are received at the M first antenna ports 304 from a subset comprising $X_0$ second antenna ports 312 among the N second antenna ports 308. Based on the RSs 310, the partial channel state 314 relating the $X_0$ second antenna ports 312 to the M first antenna ports 304 is estimated at the first station 100.

Each of the first and second antenna ports 304 and 312 may correspond to a physical antenna, e.g., an antenna element of first and second antenna systems.

In the step 204, at least one extended channel state 314-316 is constructed based on the partial channel state 314. Thus, there are at least two channel states, namely the partial one and the one or more extended channel states. From each of the at least two channel states one or more precoders may be derived according to one or more precoding types.

The precoder may also be referred to as a precoder. Each of the precoders may comprise a set of precoding vectors or a matrix including the set of precoding vectors.

Each of the precoding vectors may correspond to one of the M first antenna ports 304.

The transport format, and thus the precoder for the MIMO channel 302, is selected according to the metric in the step 206. The selected transport format is used for transmitting data 318 from the first station 100 to the second station 306 in the step 208.

The non-limiting and exemplary embodiment of the second station 306 comprises N=3 antennas 308 and uses $X_0$=2 antennas 312 out of its antennas 308 for transmitting the reference signals 310. Hence, the partial channel state corresponds to rank $r_0$=2 and the extended channel state corresponds to rank $r_1$=3.

Most UEs 306 today utilizes M=2 antennas 308 for reception, and hence support 2-layer transmissions in downlink (DL). That is, the precoder derived from a full channel state (e.g., an extended channel state) of the MIMO channel 302 has two precoding vectors for rank $r_1$=2. However, in the uplink (UL) only one single antenna 312 is used for transmission, which includes the transmission of the reference signals 310. Hence, $X_0$=1.

The number of $X_0$ transmit (Tx) antennas 312 being less than the number of N receive (Rx) antennas 308 limits the channel sounding possibility (i.e., the channel estimation based on reference signals in the step 202) for the reciprocity-based MIMO channel 302. The result is that the RBS 100 (e.g., an eNB) only has information of the partial channel state 314 (which is also referred to as partial channel state information or partial CSI) available for DL transmissions 208 or constructs an extended channel state 314-316 (which is also referred to as extended CSI).

It may be expected that most embodiments of the second station 306 (e.g., terminals and UEs) in the near future will have less Tx antennas 312 than Rx antennas 308. One reason for this may be that for a fixed transmit power at the second station 306, the power per antenna 312 is less, the greater the number of $X_0$ antennas 312, which potentially decreases UL coverage.

The step 204 of constructing at least one extended CSI enables DL transmissions with rank $r_i$>$X_0$ for the at least one i≥1. The step 204 is also referred to as a channel reconstruction or a partial MIMO channel reconstruction. In the step 206, the missing spatial degrees of freedom of the MIMO channel 302 (e.g., for example the missing one or more layers in the case of orthogonal extension) are obtained through manipulations of the known parts (i.e., the partial CSI).

The extended channel state 314-316 resulting from the step 206 provides a working basis for further signal processing for the MIMO channel 302, such as precoding calculation (e.g., derivation of the precoder from the respective CSI) and/or spatial multiplexing (e.g., using the derived precoder for the data transmission 208).

Based on the partial CSI represented or representable by a matrix H, (e.g., a vector in the case $X_0$=$r_0$=1), the extended CSI (e.g., the full rank channel in the case $r_1$=N) may be constructed in the step 204 according to a constructing type.

Two exemplary constructing types are described, namely orthogonal extension and projection. The step 206 may be implemented using further and/or other constructing types. Moreover, while the constructing types are explained for the case of M=N=2 antennas, the skilled person can readily defines constructing types for any other numbers M≥2 and N≥2.

Each CSI may be represented or representable by a channel matrix. Each column vector in the channel matrix may correspond to one of the $X_i$ second antenna ports (wherein i=0 for the partial CSI and i≥1 for the at least one extended CSI). The extended CSI represented or representable by a matrix $\tilde{H}_{ext}$ may be constructed according to the constructing type "orthogonal extension" based on the partial CSI:

$$H_P = \begin{bmatrix} H_{pol1} & ? \\ H_{pol2} & ? \end{bmatrix} \rightarrow \tilde{H}_{ext} = \begin{bmatrix} H_{pol1} & H_{pol2} \\ H_{pol2} & -H_{pol1} \end{bmatrix}.$$

The missing column vector (indicated by question marks "?" in above partial CSI) is constructed to be orthogonal to the known column vector (i.e., the partial CSI). More generally, the one or more column vectors representing the partial CSI may be define a subspace of the MIMO channel 302, and orthonormal basis vectors of the orthogonal complement of the subspace may complement the partial CSI to the extended (e.g., full) CSI. Depending on the precoding type, there may be a one-to-one correspondence between $r_0$=$X_0$ layers among the $r_i$ layers derived from the extended CSI and the $r_0$ layers derived from the partial CSI. For example, the first and only layer of a transmission with rank $r_0$=1 derived from the partial CSI may be identical with the first layer of a transmission with rank $r_1$=N derived from the extended CSI.

Alternatively or in addition, the extended CSI represented or representable by a matrix $\tilde{H}_{ext}$ may be constructed according to the constructing type "projection" based on the partial CSI:

$$H_P = \begin{bmatrix} H_{pol1} & ? \\ H_{pol2} & ? \end{bmatrix} \rightarrow \tilde{H}_{split} = \begin{bmatrix} H_{pol1} & 0 \\ 0 & H_{pol2} \end{bmatrix}.$$

The extended CSI constructed by projection does not include the column vectors of the partial CSI. Hence, there is typically no one-to-one correspondence between layers derived from the partial CSI and layers derived from the extended CSI.

The metric for selecting the transport format, e.g., the rank and the associated CSI, may be evaluated based on the respective CSI among the at least two CSIs (i.e., the partial CSI and the at least one extended CSI).

The metric evaluated for each of the at least two CSIs may be a function of layer-specific channel qualities. The ratio between a signal level and a level for interference and noise (signal-to-interference-plus-noise ratio or SINR) at the second station 306 is an example for the layer-specific quality.

For the evaluation of the metric for the i-th CSI of the at least two CSIs, the layer-specific channel quality may be computed for each of the $r_i$ layers. The layer-specific channel qualities for the i-th CSI may be computed based on the i-th CSI. Optionally, each of the layer-specific channel qualities are further corrected by an offset (which may also be referred to as a bias or penalty).

While the SINR is described as an example for the layer-specific channel quality, the channel quality may be a layer-specific signal-to-noise ratio (SNR) or a layer capacity in variants of any embodiment.

Figure 4A:
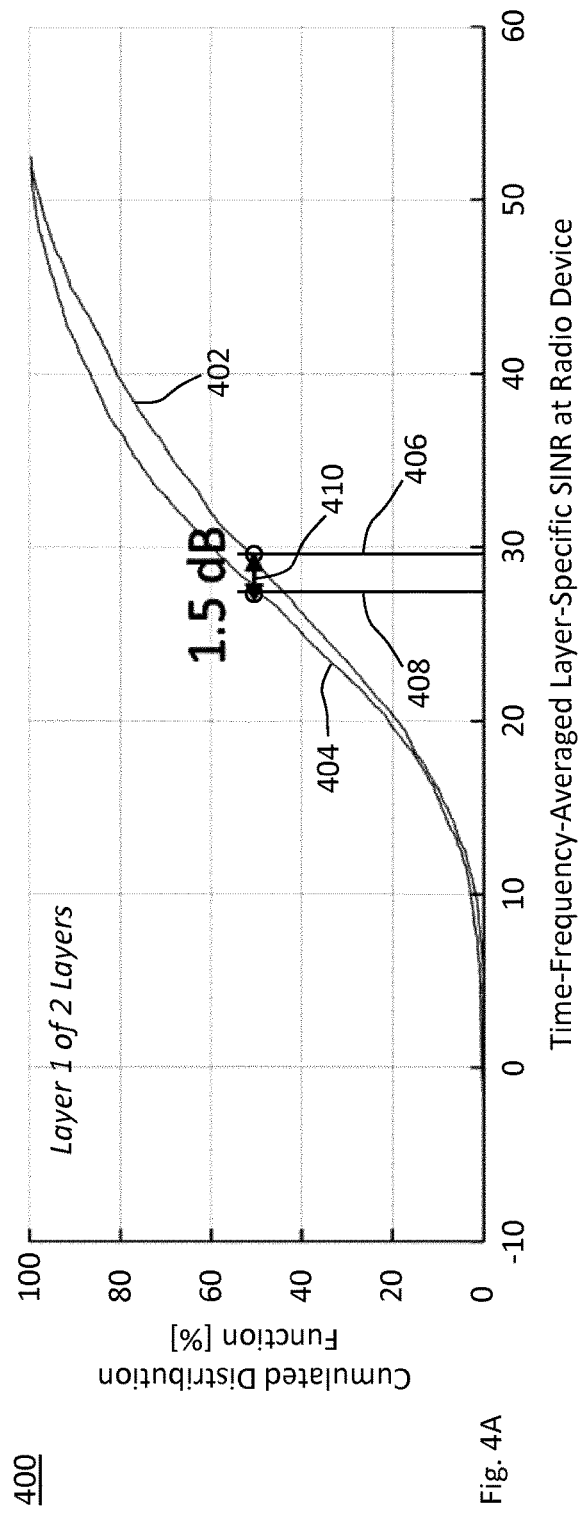
FIG. 4A shows an exemplary statistical distribution of a SINR on a first layer of a MIMO channel that is based on a constructed extended channel state.
Figure 4B:
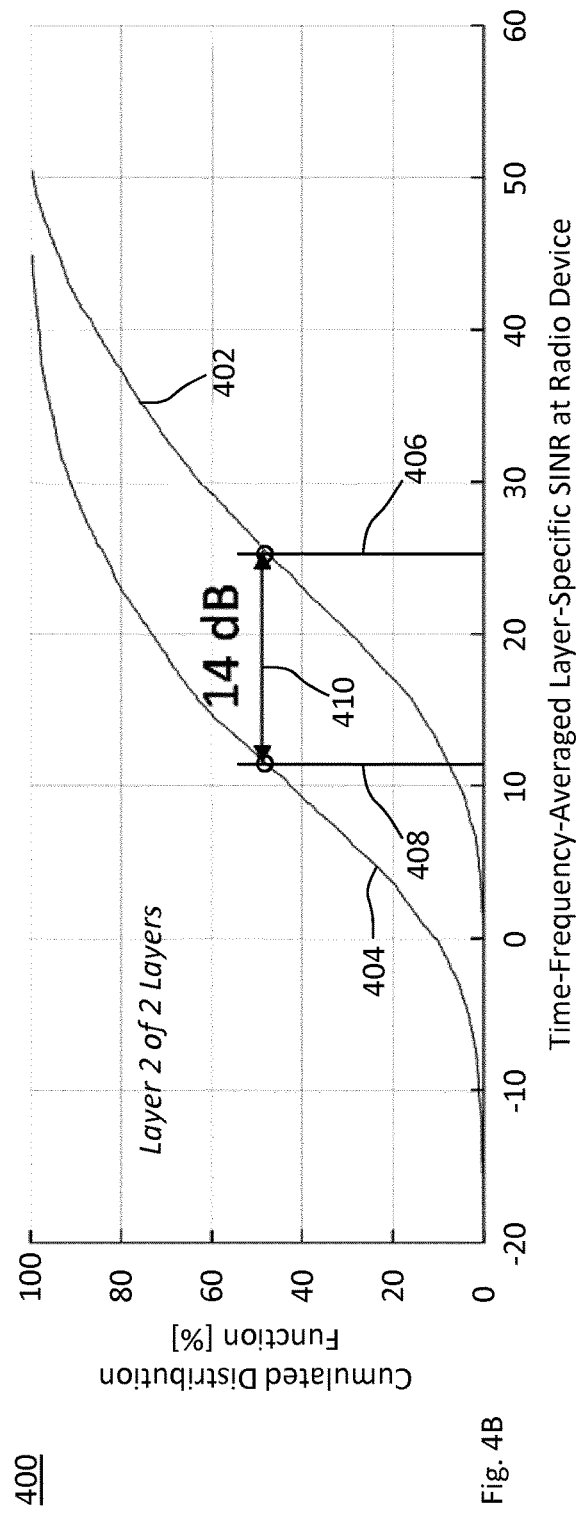
FIG. 4B shows an exemplary statistical distribution of a SINR on a second layer of a MIMO channel that is based on a constructed extended channel state.

FIGS. 4A and 4B show examples of probability distributions for the SINR at the second station 306 on the first layer and the second layer, respectively, of a 2-layer transmission 208, i.e., for a rank $r_1=2$ of the MIMO channel 302. More specifically, the FIGS. 4A and 4B show graphs of a cumulated distribution function resulting from numerical simulations of the SINR averaged over time and frequency (e.g., over one or more radio resource blocks). The $r_1=2$ layers are derived from the extended CSI resulting from the step 204.

In each of the FIGS. 4A and 4B, a SINR distribution 402 is shown for comparison, which results from MU-MIMO precoding based on a full-dimensional measurement of the CSI (also: full-dimensional UE sounding). That is, the SINR distribution 402 would be achieved, if the full CSI would be available at the first station 100 from a channel estimation that is based on reference signals received from all N second antenna ports 308.

The actual SINR distribution 404 results from MU-MIMO precoding based on the extended CSI of the step 204. More specifically, the precoder is derived from the partial sounding in the step 204 with orthogonal extension as the constructing type in the step 206.

Based exclusively on the extended CSI, the SINR 406 (e.g., the expectation value of the SINR distribution 402) as an example for an indicator of the layer-specific channel quality overestimates the channel quality. In contrast, the SINR 408 (e.g., the expectation value of the SINR distribution 404) is the actual or corrected SINR of the first and second layers shown in FIGS. 4A and 4B, respectively.

In the step 206, the evaluation of the metric for the i-th extended CSI is based on the corrected SINR 408 for each of the layers of the i-th extended CSI. The corrected SINR 408 is determined by computing the SINR 406 based exclusively on the i-th extended CSI and by subtracting an offset 410.

In any embodiment, the offset 410 may be layer-specific.

For example, since the extended CSI is constructed according to orthogonal extension as the constructing type, the first layer derived from the partial CSI corresponds to the first layer of the extended CSI. Therefore, the first layer of the precoder derived from the extended CSI is closer to the first layer of a full-CSI-based precoder (which is not available at the station 100 due to the silence of some of the N second antenna ports 308). Thus, a greater offset 410 for correcting the channel quality 406 is applied for the second layer (as shown in FIG. 4B) compared to the offset 410 applied for the first layer (as shown in FIG. 4A).

Without the correction by the offset 410, applying a conventional adaptation technique to the at least one extended CSI resulting from the construction 204 leads to inaccurate results, since the portion of the MIMO channel that is missing is constructed in the step 204 according to a constructing type and is not based on a further measurement of the MIMO channel 302. Herein, the missing portion may be the portion or subspace of the MIMO channel 302 for which no channel estimation is performed in the step 202 and which is, thus, not represented by the partial CSI. In other words, the missing portion may encompass the precoding vectors that span the portion of the MIMO channel 302 that is not mapped out by measuring reference signals in the step 202.

The inaccuracy introduced in the step 204 by extending the channel estimation 202 of the partial CSI impacts the beamforming quality and only a part of the beamforming gain can be achieved using the extended CSI (i.e., by using the precoder derived from the extended CSI).

FIGS. 4A and 4B display SINR distributions for the case of a rank-2 transmission with the comparison between a two-TX SRS channel estimation 402 and a single-TX SRS estimation 404 in the step 202 using the construction 204. The comparison shows that the two layers of the rank-2 transmissions are not equally well matching the case without the construction 204 (i.e., the case of full CSI-based channel estimation). Without the correcting offset 410, the construction 204 can create distortions in the scheduling process, particularly in the link adaptation and/or the rank adaptation that estimates the channel quality to schedule or select the transport format (also referred to as transport formats), e.g., the MCS and/or the rank.

The impact of the channel construction 204 on different layers is different. Accordingly, the offset 410 is layer-specific, i.e., different layers of the same precoder may have different offsets 410. For each of the at least two layers of the precoder derived from the at least one extended CSI, the offset 410 corrects the gap between the line 404 and the line 402. For the above example illustrated in the FIGS. 4A and 4B, the layers 1 and 2 of the extended CSI with rank $r_1=2$ are corrected by offsets 410 equal to 1.5 dB and 14 dB, respectively.

Furthermore, in any embodiment, the value of the offset 410 may depend on a radio propagation environment (e.g., one or more environment parameters) of the MIMO channel 302 and/or transmission parameters such as the precoding type (e.g., a beamforming algorithm) and the number of the M first antenna elements. The transmission parameters may also be referred to as system parameters.

The layer-specific offsets 410 for each of the at least one extended CSI may be caused or increased by additional cross talk between the layers (e.g., represented by a system parameter such as the precoding type and/or the layer correlation caused by the radio propagation environment) and/or additional interference (e.g., represented by an environment parameter). For example, even for the orthogonal extension as the constructing type in the step 204, a non-zero offset (e.g., the 1.5 dB offset in FIG. 4A) for the layer 1 may results from the channel construction 204 due to an inter-layer correlation caused by the radio propagation environment.

In any embodiment, the offset may account for an uncertainty or inaccuracy introduced by the channel construction 204 in the selection of the transport format (e.g., transport format allocation, link and/or rank).

In any implementation of the method 200, the evaluation of the metric for an extended channel state in the step 206 may comprise applying (e.g., subtracting) the offset to a channel quality estimator for the selection 206 of the transport format. The offset applied may depend on one or more system factors and/or environment factors. For example, the offset may depend on at least one of the following factors. A first factor is the considered layer, e.g., the index of the layer and/or the number of layers (i.e., the rank $r_i$). For example, the offset for the first layer may be less than the offset for the second layer. A second factor is the constructing type (i.e., the considered construction method). A third factor is the environment, e.g., the propagation environment for the MIMO channel. A fourth factor is the precoding type (i.e., the method applied for deriving the precoder from the respective channel state). A fifth factor is the number, M, of the first antenna ports at the first station used for receiving the reference signals, e.g., the number of antennas at the reconstruction side.

Alternatively or in addition to any one of the factors, the offset may be adapted dynamically over time, e.g., depending on a DL transmit SNR and/or a SNR (or any other channel quality indicator) reported from the second station to the first station).

In any embodiment, the transport format may comprise at least one of the rank and one or more link parameters (e.g., a modulation scheme and/or a coding scheme).

The transport format may comprise a combination of rank and modulation and coding scheme (MCS). The method 200, e.g., the step 206, may be implemented as a rank adaptation and/or a link adaptation. Herein, the "link" may relate to the MCS used for the MIMO channel 302.

FIG. 5 shows a flowchart for an exemplary implementation of the method 200. The method 200 may be implemented as a simplified transport format allocation, e.g., at the eNB 100. Preferably, the step 206 comprises testing different transport formats (e.g., different settings for the rank and/or the MCS) by evaluating the metric for each of the at least two different CSIs (i.e., the partial CSI and the at least one extended CSI).

Each of the at least two CSIs may be tested in association with at least one transport format. For example, the number of the second antenna ports, $X_i$, related by the i-th CSI may define the rank $r_i$. The metric may be evaluated for the i-th CSI using layer-specific channel qualities determined for a precoder with the rank $r_i$.

The implementation of the method 200 may comprise the step 206 of selecting the transport format among the tested transport formats. Each of the tested transport formats may be associated with one of the at least two CSIs. The selected transport format may maximize the metric. The total throughput is an example for the metric.

The first station 100 gets signal estimates for the MIMO channel 302 in a step 502. The signal estimates may comprise the received reference signals and/or the partial channel state resulting from the channel estimate.

For example, the step 502 may comprise receiving the reference signals from the second station 306 or may be based on the received reference signals. Alternatively or in addition, the step 502 may comprise the step 202 of performing the channel estimate based on the received reference signals or may be based on the partial channel state resulting from the step 202. Alternatively or in addition, the step 502 may comprise the step 204 of constructing the at least one extended channel state or may be based on the at least one extended channel state resulting from the step 204.

Optionally, the step 502 comprises receiving, from the second station 306 at the first station 100, a report that is indicative of a noise level $\sigma_k^2$ at the second station 306, a SINR $p_i$ at the second station 306 and/or a reference signal received power (RSRP) at the second station 306. The noise level, the SINR and/or the RSRP may be indicated for each layer (labeled by k), or for each second antenna port (labeled by k).

In a step 504, e.g., a substep of the step 206, the first station 100 determines a precoder for each of the at least two CSIs (e.g., for each available rank). Each of the precoders comprises a precoding vector for each layer.

While the step 204 of constructing the at least one extend channel state using the partial channel state may be implemented in the step 502 according to a first variant, a second variant may implement the step 204 as a substep of the step 504. For example, the step 504 may, for each available rank, use the partial CSI state or (as is necessary for the respective rank) construct the extended CSI to determine a precoder with the respective rank.

In any variant, the precoder may be determined in the step 504 according to a precoding type. The precoder may be represented or representable by a matrix T.

Such a precoder is determined for each available rank $r_i$, $i \geq 0$.

Zero-forcing (ZF) is an example for the precoding type. The precoding 504 for ZF as the precoding type may be implemented in accordance with:

$$H^H \circ T = \text{diag}[(p_1^{(constructed)})^{1/2}, \ldots, (p_{X_i}^{(constructed)})^{1/2}], \qquad (1)$$

so that $\Sigma k=_{1 \ldots X_i} \log(1+p_k^{(constructed)}) = \max$, (2)

wherein the symbol H (i.e., the channel matrix) denotes the corresponding one of the at least two CSIs, the symbol "$H^H$" denotes the conjugate transpose of H and the symbol "$\circ$" denotes the matrix product. The ZF condition (1) aims at eliminating interference between the layers. The parameters $p_k^{(constructed)}$ are free parameters subject to a total power constraint and determined by the maximization problem (2).

A size of the channel matrix H for the i-th channel state is $M \times X_i$. A size of the channel matrix T for the i-th channel state is $M \times X_i$. There are $X_i$ parameters $p_k^{(constructed)}$, $k=1 \ldots X_i$. For example, $X_i=N$ for the extended CSI.

The parameter $p_k^{(constructed)}$ is an example for the layer-specific channel quality for the k-th layer, namely the SINR 406, determined exclusively based on the partial CSI, i.e., independent of the radio propagation environment.

Optionally, e.g., based on the report from the second station 306, the reciprocal CSI $H^H$ in the precoding condition (e.g., the ZF condition (1)) is replaced by a renormalized reciprocal CSI, $H'^H$, wherein:

$$H' = [h_1 \cdot \sigma'_1/\sigma_1, \ldots, h_{X_i} \cdot \sigma'_{X_i}/\sigma_{X_i}],$$

wherein $H = [h_1, \ldots, h_{X_i}]$ is the CSI among the at least two CSIs determined at the first station 100 (i.e., the partial CSI and the at least one extended CSI). The (e.g., reported) noise level at the second station 306 for the k-th second antenna port is denoted by the symbol $\sigma_k^2$. The (e.g., measured) noise level at the first station 100 for the k-th layer port is denoted by the symbol $\sigma'^2_k$.

In the substep 506 of the step 206, the metric is evaluated for each available rank, e.g., for each determined precoder. The metric may be evaluated based on the layer-specific channel qualities (e.g., the parameters $p_k^{(constructed)}$), optionally after correcting those channel qualities that are based on the at least one extended CSI.

In the exemplary implementation of the method 200 shown in FIG. 5, the transport format is or comprises the rank. The rank (e.g., the corresponding precoder) with the highest metric is selected in the substep 508 of the step 206.

FIG. 6 shows a flowchart for an exemplary implementation of the metric evaluation 506, which may be performed for each possible rank (e.g., for each determined precoder).

In a step 602, the channel quality of each of the $r_i$ layers of the precoder (e.g., represented by the precoding matrix T) corresponding to the rank are evaluated. The precoder may be derived from any one of the at least two CSIs. The SINR $p_k^{(constructed)}$ is an example for the layer-specific channel quality.

For each rank $r_i > X_0$, e.g., for each precoder T derived from the at least one extended CSI or for each $i \geq 1$, the layer-specific channel qualities are corrected according to a step 603. For the rank $r_0 = X_0$, e.g., for the precoder T derived from the partial CSI, the step 603 may be skipped.

In an optional substep 604 of the step 603, the first station 100 gets one or more system parameters and/or one or more environment parameters. Based on the one or more system parameters and/or one or more environment parameters, the offset $p_k^{(offset)}$ is evaluated for each of the layers in a substep 606 of the correcting step 603.

The respective offsets, $p_k^{(offset)}$, are applied to each of the layer-specific channel qualities in a substep 608 of the step 603 resulting in corrected layer-specific channel qualities, $p_k^{(corrected)}$. The offset may be applied by subtraction, i.e., $p_k^{(corrected)} = p_k^{(constructed)} - p_k^{(offset)}$.

The layer-specific channel qualities (e.g., the corrected channel qualities for $i > 0$) are converted to additive metrics in the step 610. For example, the additive metric $t_k$ for the k-th layer corresponding to the channel quality $p_k^{(corrected)}$ may be converted in accordance with $$t_k = \log(1 + p_k^{(constructed)}).$$

The above conversion may further comprise any scaling factor or any basis for the logarithm.

The additive metrics of all layers for the respective precoder are aggregated in the step 612 resulting in the metric for the respective precoder and, thus, for the respective rank $r_i$. For example, the metric may be the sum $\Sigma_k t_k$ over all layers $k=1, \ldots, n$.

The channel quality resulting from the channel construction is better than the actual (or practical) channel quality of the respective layer. The offset is a bias or penalty in the transport format selection process 206 to correct the channel quality derived from the channel construction 204 (e.g., the signal quality measured and/or computed via the constructed channel), which is artificially degraded for each layer. For instance, if the signal quality is measured as the SNR value, an SNR offset can be applied to the targeted layers to reduce the mismatch.

The correction 603 in the evaluation 506 of the metric (e.g., the data rate or data throughput) reduces the metric, which may trigger the selection 206 (e.g., the rank adaptation) to switch to a more conservative transport format (e.g., to a lower transmission rank).

Figure 7:
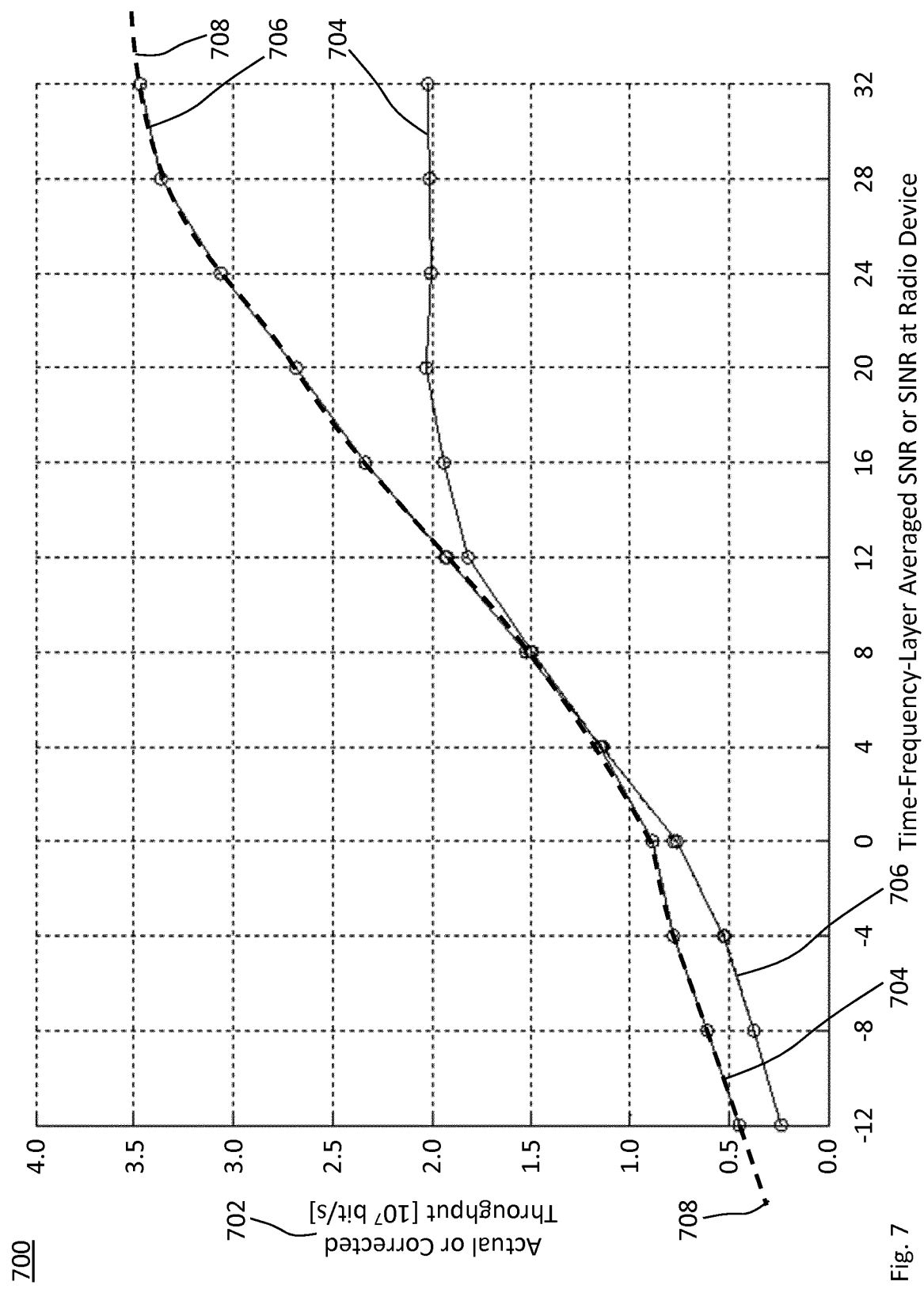
FIG. 7 shows exemplary graphs of a data throughput as a function of a SNR or a SINR at a receiver.

FIG. 7 shows an exemplary graph of the data rate (also: data throughput) as an example for the metric 702. More specifically, the metric 702 is shown as a function of a SNR or a SINR at the second station 306, e.g., the receiver of the data transmission 208.

The graph 704 is an example for the metric 702 evaluated for the partial CSI, e.g., for a rank $r_0 = X_0 = 1$. The graph 706 is an example for the metric 702 evaluated for the at least one extended CSI, e.g., for a rank $r_0 = X_0 = 2$. For the graph 706, the metric 702 has been corrected, e.g., according to the step 603. The corrected metric 702 matches the actual metric when the precoder derived from the extended CSI is used to measure the data rate (also: data throughput) as the example for the metric 702.

The dashed graph 708 is an example for the data rate resulting from an implementation of the method 200. For a high SNR or SINR, e.g., above 8 dB, the step 206 selects the rank $r_1 = 2$. Thus, the data transmission 208 uses the precoder derived from the extended CSI. For a low SNR or SINR, e.g., below 8 dB, the step 206 selects the rank $r_0 = 1$. Thus, the data transmission 208 uses the precoder derived from the partial CSI.

Herein, using a precoder that is derived from the at least one extended (i.e., constructed) CSI may also be referred to as using a "constructed channel".

Furthermore, as verified by simulation results, applying a rank adaptation for the selection 206 of the rank among at least two available ranks can lead to a failure, if at least one rank $r_i > 1$ of the available ranks is realized based on an extended CSI and the metric evaluated for the extended CSI is not corrected (e.g., if the step 206 is implemented without the correction 603). The failure may encompass selecting the rank-2 transmission, even though the rank-1 transmission has a better performance (e.g., in terms of the actual data throughput), due to a wrongly overestimated channel quality (e.g., the SINR $p_k^{(constructed)}$). As a consequence of such failure, in the range of low SNR or SINR (e.g., below 8 dB), the actual data rate achieved by the beamformed channel in the step 208 using the precoder based on the constructed (i.e., extended) CSI is worse than assumed or estimated by the uncorrected metric.

As a comparative example, applying a conventional rank adaptation (e.g., a rank selection exclusively based on the respective CSI without correction) to the at least two CSIs comprising at least one extended CSI may result in a failure. The failure may encompass that the conventional rank adaptation does not switch to rank=1 in the region of low SNR or SINR, because the data throughput on the second layer (as an example of the additive metric for the second layer k=2 for rank $r_1 = 2$) is overestimated, i.e., is systematically estimated to be greater than the actual data throughput. The mismatch between the uncorrected metric evaluated for one or more constructed channels (e.g., beamformed channels) and the actual metric achieved by the constructed channels causes the conventional rank adaptation to not work. In at least some situations, if a constructed channel is available for selection, the conventional rank adaptation may always select rank 2 even in the range of low SNR or SINR.

In contrast to the comparative example, an implementation of the method 200 may switch to the conservative rank $r_0 = X_0$ in the range of low SNR or low SNIR, e.g., to the rank $r_0 = X_0 = 1$, as illustrated in FIG. 7.

The correction of the metric evaluated for an extended CSI, e.g., the offset determined for each layer, may depend on at least one of the afore-mentioned factors and/or at least one of the factors 802 (also: criteria) described with reference to FIGS. 8 to 11. Each of these factors may be implemented as functionally described (e.g., independent of the respective figure) or as schematically illustrated in the respective figure. Furthermore, two or more of the factors may be combined.

Optionally, the transport format may depend on or comprise one or more of the factors 802.

When referring herein to a growing or increasing offset 410, a magnitude of the subtracted offset or negative offset may grow or be increased.

A first factor 802 is the number of antenna ports (e.g., antennas or antenna elements) at the first station 100 (i.e., the number of the M first antenna ports), at the side of the channel construction and/or at the transmitter of the step 208. The number of antenna ports may correspond to a number of how many coefficients of each precoding vector or how many rows of a precoding matrix are to be construct in the step 204. The number of antenna ports can impact a SNR or SINR at the second station 306 or a quality of reception. A maximum beamforming gain is dependent on the number of antenna ports, and if the coefficients for the antenna ports are not well constructed, the maximum gain will not be reached. The offset (i.e., the penalty) may grow with the number of the first antenna ports, which may reflect a reduced beamforming gain due to the channel construction 204.

Figure 8:
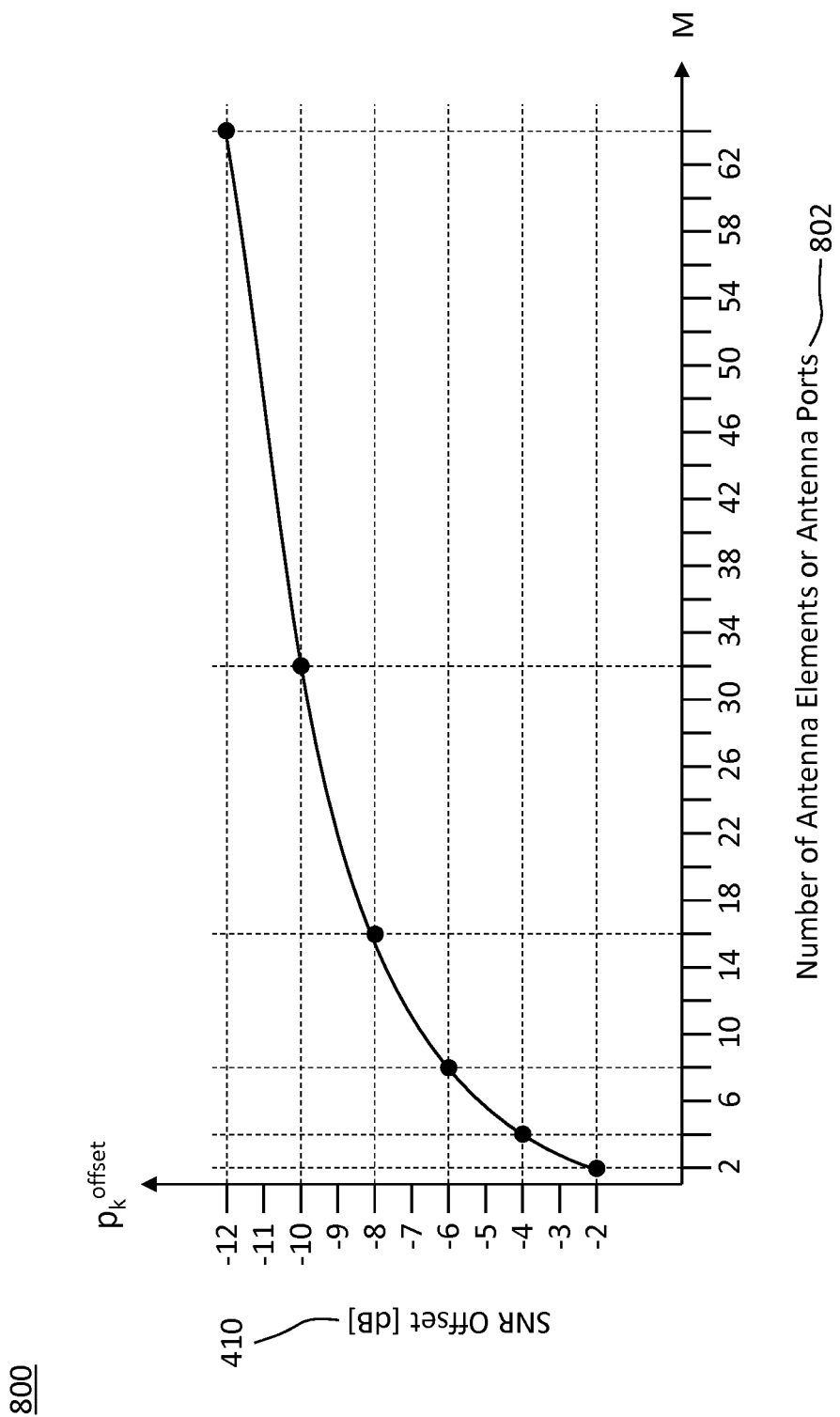
FIG. 8 schematically illustrates an exemplary offset for evaluating the metric as a function of a number of first antenna ports, which may be implementable in any embodiment of the device of FIG. 1 or any implementation of the method of FIG. 2.

By way of example, the offset may be increased by −2 dB per doubling the number of antenna ports and/or an offset equal to −12 dB may be used for 64 antenna ports. FIG. 8 schematically illustrates an exemplary offset for the correction 603 in the evaluation of the metric 702 as a function of the number, M, of the first antenna ports.

Figure 9:
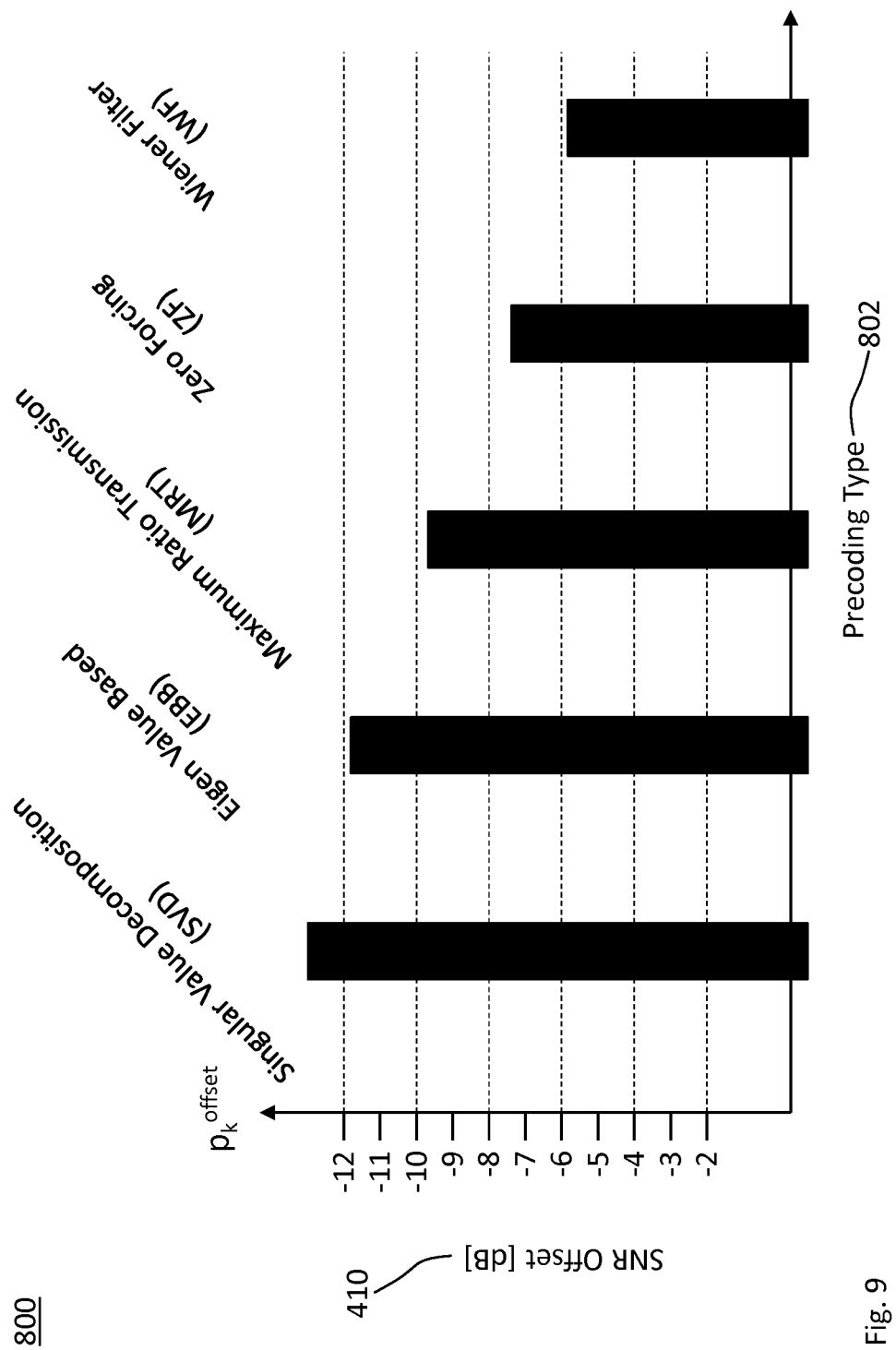
FIG. 9 schematically illustrates an exemplary offset for evaluating the metric as a function of a precoding type, which may be implementable in any embodiment of the device of FIG. 1 or any implementation of the method of FIG. 2.

A second factor 802 is the precoding type. A magnitude of the offsets may depend on the precoding type. A schematic example for the second factor 802 is illustrated in FIG. 9.

Alternatively or in addition, the precoding type may control a distribution of a total offset or a redistribution of the layer-specific offsets among the two or more layers of a precoder determined based on an extended CSI according to the precoding type. In case the determination 504 of the precoder involves an aggregate computing of all layers, the error of the channel construction 204 is spread over all layers. Thus, the total offset estimated for the MIMO channel 302 can be shared or split between two or all of the layers or the layer-specific offsets may be (at least partially) redistributed between two or all of the layers.

For example, for SVD or EBB as the precoding type, some of the error or total offset is assigned to both or all layers. As another example, in a determination 504 of the precoder using MRT as the precoding type, each layer may be independently processed. In other words, the determination 504 may focus on each layer independently. The layer-specific offsets (e.g., an evaluated penalty for each layer) may be unchanged if the precoding type is MRT.

In any embodiment and any implementation of the method 200, the offset 410 to be applied may depend on each specific layer, i.e., the correction of the channel quality may be layer-specific, as the layers are not equally affected by the channel construction 204.

Figure 10:
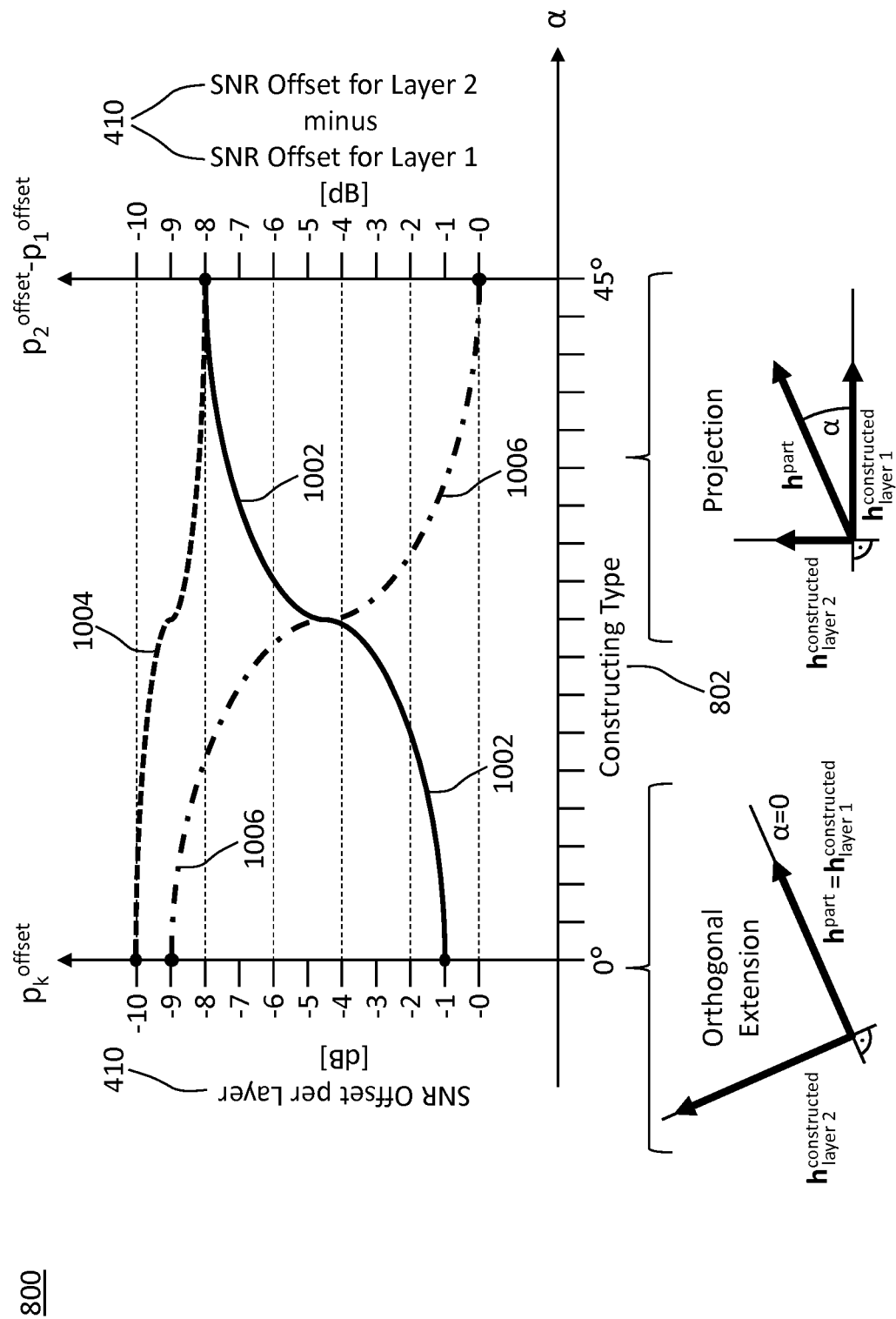
FIG. 10 schematically illustrates an exemplary offset for evaluating the metric as a function of a constructing type, which may be implementable in any embodiment of the device of FIG. 1 or any implementation of the method of FIG. 2.

A third factor 802 is the considered constructing type (also: reconstruction method), e.g., as schematically illustrated in FIG. 10. For instance, the layer of a precoder derived from the extended CSI, which layer is closest to the layer derived from the partial CSI (e.g., the first layer), may be less degraded than another layer (e.g., a second layer) of the same precoder. Hence, a smaller or no offset may be applied for the first layer, while the second layer may have severe degradation and requires a strong offset. For example, following the exemplary situation shown in FIGS. 4A and 4B using orthogonal extension as the constructing type, a first offset equal to −1 dB may be applied for the first layer, while a second offset equal to −13 dB may be applied for the second layer.

The constructing type used for constructing the extended channel state (or extended CSI) in the step 204 may determine how close or similar the first layer of the precoder derived from the extended CSI is to a first layer (e.g., the only one layer) corresponding to the partial CSI. For example, as schematically illustrated in FIG. 10, the constructing type may be represented by an angle α. The cosine of α may be indicative of the closeness, similarity or conformance between the first layers of the derived from extended and partial CSIs, respectively. Orthogonal extension as the constructing type may correspond to an angle α=0 or cos α=1. Projection as the constructing type may correspond to an angle α>0 or cos α<1.

As schematically illustrated in FIG. 10, for a constructing type α=0, the first offset 1002 applied to the first layer may be small or minimal (optionally equal to zero). The second offset 1004 applied to the second layer may be large or maximal. As the angle α representing the constructing type 802 is increased, the first offset may increase and/or the second offset may decrease. For the angle α=45, the error introduced by the channel construction 204 may be equally distributed for the first and second layers. That is, the different 1006 between the layer-specific offset is zero.

FIG. 10 comprises insets below the horizontal axis for the constructing type 802. The insets schematically illustrate the decomposition or processing of the vector $h^{part}$ representing the partial CSI $[h_1\ h_2]$ resulting into the vectors $h^{constructed}$ for layers 1 and 2 representing the rows of the channel matrix of the extended CSI. For the projection, sin α may be equal to $h_2/h_1$.

Depending on the constructing type, the accuracy error may be localized on a single part of the channel (e.g., on the second layer or highest layers) or may be spread over multiple layers. For instance, using the projection as the constructing type (which is also referred to as zeroing-expansion matrix reconstruction), e.g., in accordance with $$[h_1 h_2; ??] \to [h_1 0; 0 h_2],$$

some of the error introduced by the channel construction 204 is included on all layers. The offset may be set equal, for example −3 dB, for both or all layers of the respective precoder.

As another example, using the orthogonal expansion as the constructing type, e.g., in accordance with $$[h_1 h_2; ??] \to [h_1 h_2; h_2 -h_1^*],$$

the channel construction 204 focuses the known portion of the MIMO channel (i.e., the portion known based on the partial CSI) towards the first layer only. Thus, offsetting the fully constructed second layer for the mismatch may be enough. For example, the first and second offsets equal to 0 dB and 10 dB may be applied for the first and second layers, respectively. Thus, depending on the constructing type as the third factor 802, the offset may be different and/or differently applied over the layers.

In any embodiment, the constructing type may determine on which layer to apply the offset, e.g., as indicated in below Table.

| Constructing type | Layer-specific application of the offset |
|---|---|
| Projection or zeroing expansion (e.g. $[h_1\ 0;\ 0\ h_2]$) | Applied to both or all layers. (e.g., about −3 dB) |
| Orthogonal or cross-product construction (e.g. $[h_1\ h_2;\ h_2\ -h_1^*]$) | No offset on the first layer. High offset on the second layer. |

Figure 11:
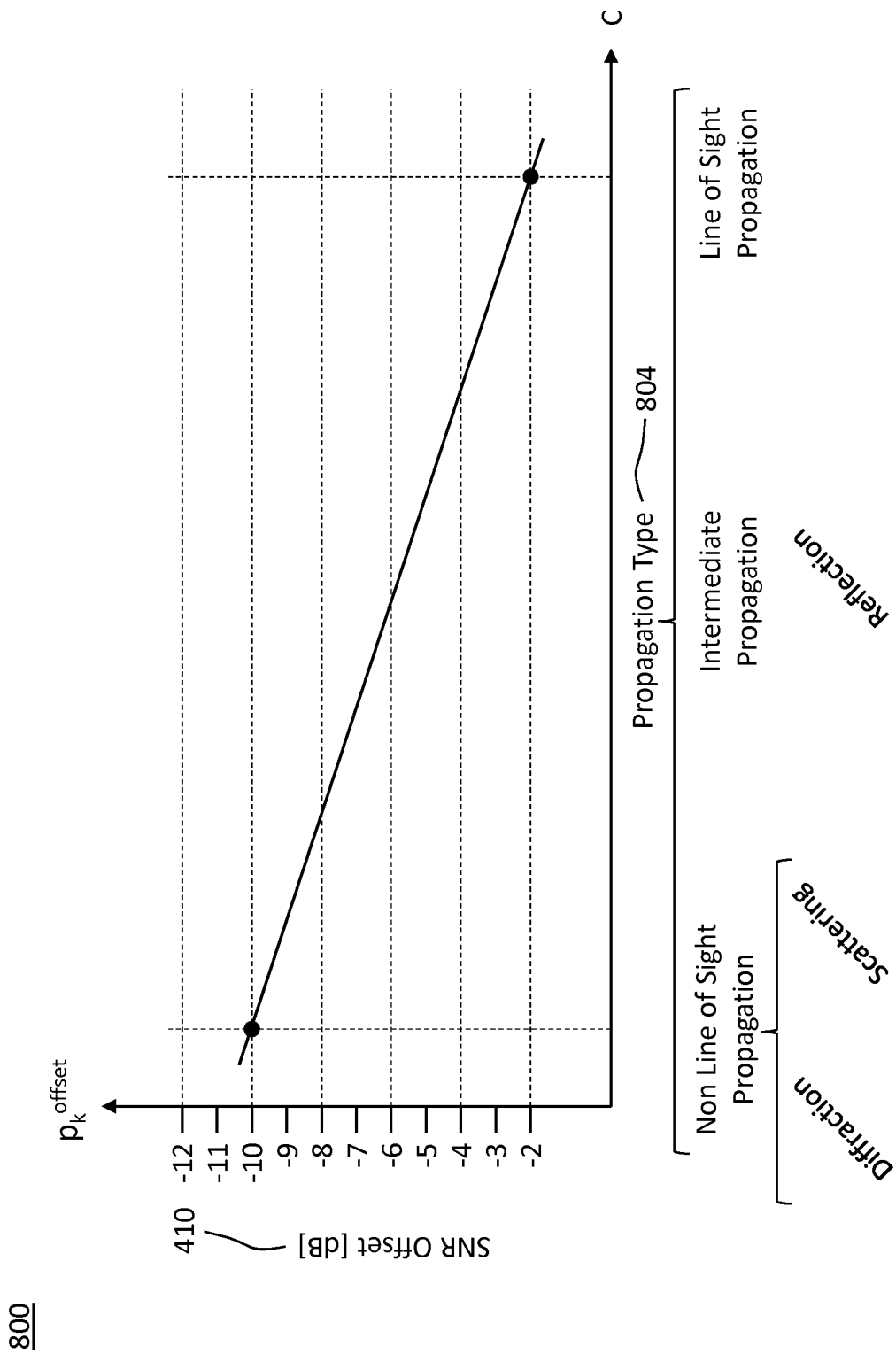
FIG. 11 schematically illustrates an exemplary offset for evaluating the metric as a function of a propagation type, which may be implementable in any embodiment of the device of FIG. 1 or any implementation of the method of FIG. 2.

A fourth factor may relate to the environment of the MIMO channel 302, i.e., the propagation environment. The environment may be represented by one or more environment parameters 804, e.g., as illustrated in FIG. 11. A propagation type is an example for an environment parameter 804. The offset may depend on the propagation type.

The environment parameter 804 may be indicative of a correlation between different spatial streams or layers (also: propagation correlation) and/or a line-of-sight (LOS) propagation. Depending on whether the propagation correlation is low or high and/or whether the propagation corresponds to a non-LOS (NLOS) environment or a LOS environment, the propagation environment influences an accuracy of the channel construction 204 and, thus, the offset.

In one example, since the missing portion of the MIMO channel 302 (i.e., the portion not measured based on reference signals) is constructed based on the measured portion of the MIMO channel 302, a high correlation between these portions is likely to result in a more accurate channel construction 204. The less correlated, the greater is the error introduced by the channel construction 204. Thus, the offset (e.g., applied for the second layer) may decrease with the propagation correlation.

In another example, which is combinable with the one example, e.g., as schematically illustrated in FIG. 11, the offset 410 may be less for a LOS environment than the offset 410 for a NLOS environment. For example, the offset 410 (e.g., applied to the reconstructed layers, i.e., the second or higher layers) may be equal to −3 dB for a LOS environment and equal to −10 dB for a NLOS environment. The NLOS environment may comprise scattering objects. The LOS environment may comprise no obstacles having a size greater than the wavelength. An intermediate environment between LOS environment and NLOS environment may comprise no reflecting objects.

A function relation between the offset 410 and the propagation type representing the propagation environment for the MIMO channel is indicated in below Table.

| Propagation environment | Magnitude of the offset |
|---|---|
| Low correlation or NLOS environment | High |
| High correlation or LOS environment | Low |

FIG. 11 schematically illustrates an example for the offset 410 as a function of an environment parameter 804, e.g., a propagation type. The propagation type may be indicative of the propagation correlation. The propagation correlation may be high for LOS and low for NLOS. Alternatively or in addition, the propagation correlation may be a decreasing function of a carrier frequency of the MIMO channel.

In a first embodiment of the first station 100 and in a first implementation of the method 200, the offset (or penalty) may be fixed or time-independent. The fixed offset may be predefined, e.g., depending on above factors or criteria.

In a second embodiment of the first station 100 and in a second implementation of the method 200, which may be combinable with the first embodiment and first implementation, the offset 410 may be adaptive. For example, the offset may be changed depending on statistics and/or learning of historical data.

The offset 410 may be changed or controlled through a layer-specific outer-loop adjustment (OLA, also: outer-loop link adjustment or OLLA), e.g., using codeword ACK/NACK to adjust the offset (i.e., the penalty). The OLA or OLLA comprise performing a mapping between codeword and layer. The mapping may distinguish between the at least one layer that is "known" (i.e., derived or derivable from the partial CSI) at the first station 100 and the at least one layer that is "constructed" (i.e., derived from portion of the extended CSI that is not identical to the partial CSI).

Alternatively or in addition, the offset 410 may be changed or controlled through the value of a downlink signal-to-noise ratio (DL-SNR), e.g., responsive to a low DL-SNR (e.g., below a predefined threshold value). The DL-SNR may be measured at and/or reported from the second station 306 to the first station 100. Since the channel quality for constructed layers (i.e., layers derived from the extended CSI, e.g., the SINR $p^{(constructed)}$) is generally better than the actual or corrected channel quality, the offset may be proportional to the DL-SNR, i.e., the lower the DL-SNR, the lower is (e.g. the magnitude of) the offset.

Alternatively or in addition, the offset 410 may be changed or controlled through timely adjustment, as the channel construction 204 and the (e.g. partial) channel state can change quickly. For the sake of simplicity, the offset can be triggered or applied only if the DL-SNR is lower than the predefined threshold. Optionally, the predefined threshold is dependent on the environment and/or deployment of the first station.

While the offset has been described for correcting the layer-specific channel qualities (e.g., by applying the offset 410 to the SINR 406 according to the step 603), a correction in the evaluation 506 of the metric 702 may also be implemented by apply one or more offsets in different steps and/or parts of the method 200. While correction has been described as an offset (also: bias or penalty) on the channel quality, the offset (or any other non-linear penalty or bias) may also be directly applied on the metric (e.g., data throughput or data rate).

Applying the offset on the channel quality or the performance metric may be implemented depending on the information available at the first station 100 for determining a value for the offset. For instance, an offset determined based on information on the MIMO channel 302 (results of measurements) and/or the precoding type may be applied on the layer-specific channel quality (also: channel quality per layer). Alternatively or in addition, an offset determined based on an outer-loop feedback (e.g., OLA or OLLA) may be applied on the metric (e.g., a performance metric).

Figures 12A, 12B:
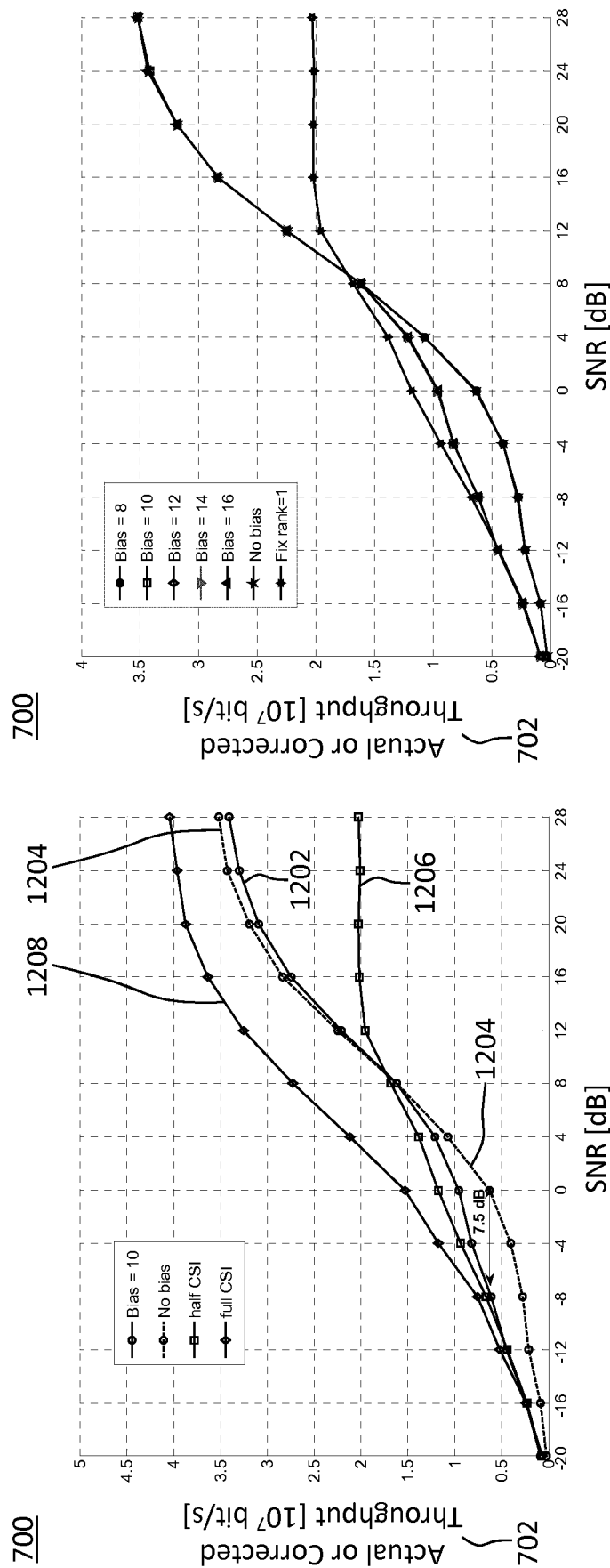
FIG. 12A schematically illustrates an exemplary effect of a fixed offset on the data throughput as a function of a SNR.
FIG. 12B schematically illustrates an exemplary effect of threshold-triggered offsets on the data throughput as a function of a SNR.

In any embodiment of the first station 100 or implementation of the method 200, a fixed offset 410 may be applied, e.g., without a threshold for the SNR or a dependency on the SNR at the second station 306 (e.g., the DL SNR). The diagram 700 in FIG. 12A schematically illustrates an exemplary graph 1202 for the data rate (also: data throughput), which is an example for the metric 702, as a function of the SNR. The metric 702 is corrected to take an error introduced by the channel construction 204 into account. In other words, the metric 702 (e.g., substantially) corresponds to the actual performance, namely the actual data rate.

The offset is applied to each of two layers independent of the SNR. In the example illustrated in FIG. 12A, the constructing type is orthogonal extension and the precoding type is EBB. The fixed offset 410 is equal to −10 dB. An effect achievable by the fixed offset 410 is also achievable using other values for the constructing type, the precoding type and/or the offset, e.g., as described with reference to FIG. 12B.

In order to illustrate the effect of the fixed offset 410, a graph 1204 for the actual data rate achieved with the offset set to zero is shown as a comparative example. As can be observed in FIG. 12A, without the offset, a suboptimal transport format is selected. Relative to the comparative example 1204 with no offset, the graph 1202 resulting from an implementation of the method 200 can achieve a gain in terms of the SNR on the order of 7.5 dB or at most 7.5 dB.

As can be observed in FIG. 12A, the fix offset 410 can cause some performance loss in the range of high SNR. This loss may be eliminated by implementing a SNR threshold to trigger the application of the offset 410 only below a threshold value for the SNR.

For comparison, the actual data rate achievable by a rank-1 transmission based on the partial CSI and a rank-2 transmission using a hypothetical precoder derived from full channel sounding is illustrated by graphs 1206 and 1208, respectively.

FIG. 12B schematically illustrates an exemplary effect of a fixed offset 410 with a threshold, which may also be referred to as step-function offset. The offset 410 is applied to each of two layers below a threshold value for the SNR. In the example illustrated in FIG. 12B, the threshold value is 4 dB. For concreteness and without limitation for the effect, the constructing type is orthogonal extension and the precoding type is EBB in the illustrated example.

As can be observed in FIG. 12B, by triggering the fixed offset below the SNR threshold, the negative impact at high SNR disappears. An effective or preferred value for the offset 410 is −10 dB. The minus sign is suppressed for conciseness in the inset in FIG. 12B. For a magnitude of the offset 410 being less than 10 dB, the performance (i.e., the actual data rate) is the same or similar to the effect achieved with zero offset. A magnitude of the offset 410 being equal to or greater than 10 dB achieves no further enhancement.

Figure 13:
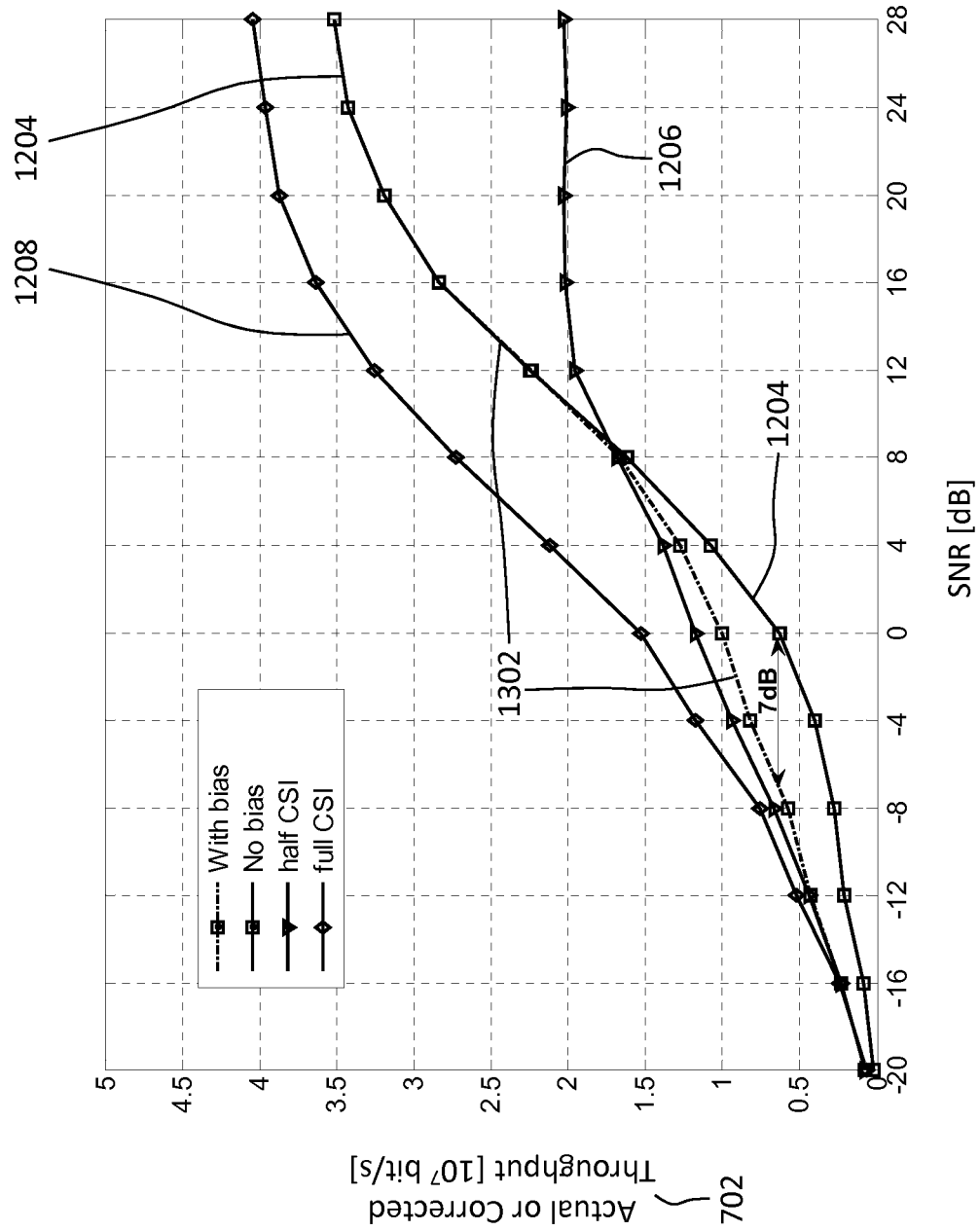
FIG. 13 schematically illustrates an exemplary effect of a dynamic offset on the data throughput as a function of a SNR.

FIG. 13 schematically illustrates an exemplary effect of a dynamic offset 410 by means of the diagram 700. The offset 410 is applied to each of two layers. In the example illustrated in FIG. 13, the constructing type is orthogonal extension and the precoding type is EBB for concreteness and without limitation for the effect.

As indicated by the graph 1302 for the actual data rate achievable by an implementation of the method 200, a gain in terms of SNR achievable by the dynamic offset 410 is on the order of 7 dB or at most 7 dB. The offset is dynamically changed according to the channel condition. Preferably, it is not necessary to determine a specific or predefined value for the offset. Furthermore, the dynamic offset has no negative impact at high DL SNR.

Figure 14:
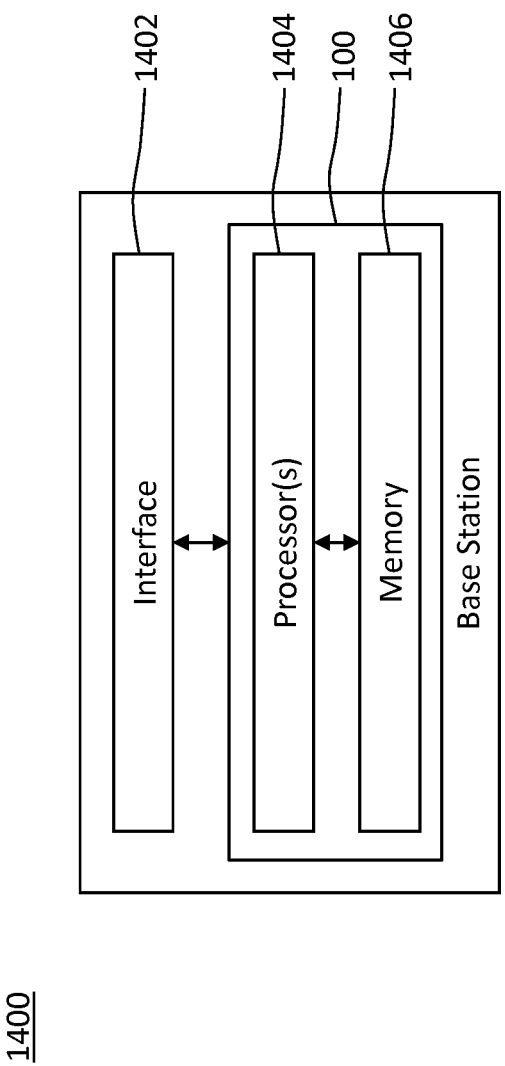
FIG. 14 shows a schematic block diagram of a base station embodiment of the device of FIG. 1.

FIG. 14 shows a schematic block diagram for an embodiment of the device 100. The device 100 comprises one or more processors 1404 for performing the method 200 and memory 1406 coupled to the processors 1404. For example, the memory 1406 may be encoded with instructions that implement at least one of the modules 102, 104 and 106, and optionally 108.

The one or more processors 1404 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 1406, base station functionality and/or access point functionality. For example, the one or more processors 1404 may execute instructions stored in the memory 1406. Such functionality may include providing various features and steps discussed herein, including any of the benefits disclosed herein. The expression "the device being operative to perform an action" may denote the device 100 being configured to perform the action.

As schematically illustrated in FIG. 14, the device 100 may be embodied by a base station 1400. The base station 1400 comprises a radio interface 1402 coupled to the device 100 for radio communication with one or more radio devices and/or one or more base stations.

Figure 15:
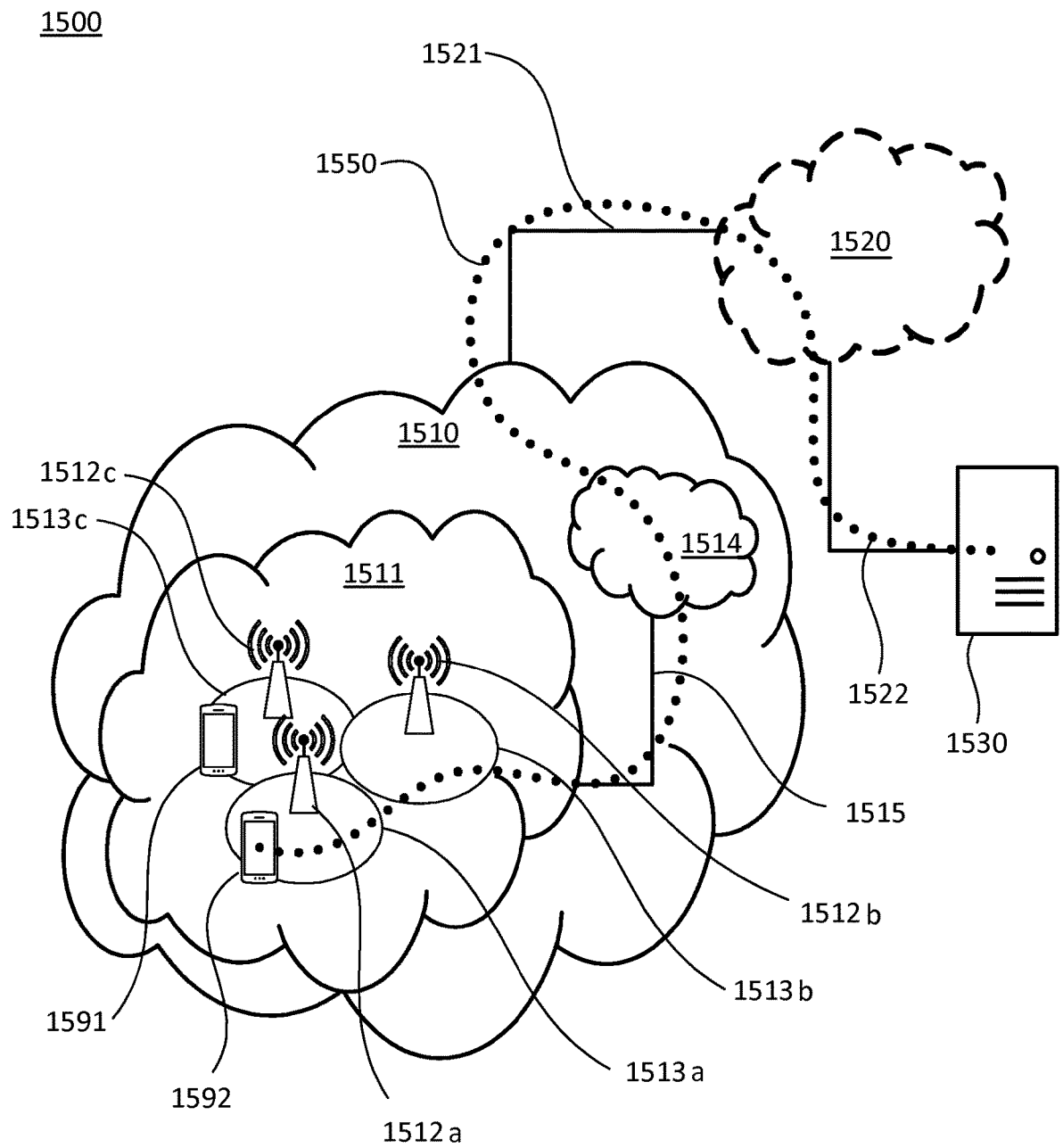
FIG. 15 schematically illustrates an embodiment of a telecommunication network connected via an intermediate network to a host computer.

With reference to FIG. 15, in accordance with an embodiment, a communication system 1500 includes a telecommunication network 1510, such as a 3GPP-type cellular network, which comprises an access network 1511, such as a radio access network, and a core network 1514. The access network 1511 comprises a plurality of base stations 1512a, 1512b, 1512c, such as NBs, eNBs, gNBs or other types of wireless access points, each defining a corresponding coverage area 1513a, 1513b, 1513c. Each base station 1512a, 1512b, 1512c is connectable to the core network 1514 over a wired or wireless connection 1515. A first user equipment (UE) 1591 located in coverage area 1513c is configured to wirelessly connect to, or be paged by, the corresponding base station 1512c. A second UE 1592 in coverage area 1513a is wirelessly connectable to the corresponding base station 1512a. While a plurality of UEs 1591, 1592 are illustrated in this example, the disclosed embodiments are equally applicable to a situation where a sole UE is in the coverage area or where a sole UE is connecting to the corresponding base station 1512.

The telecommunication network 1510 is itself connected to a host computer 1530, which may be embodied in the hardware and/or software of a standalone server, a cloud-implemented server, a distributed server or as processing resources in a server farm. The host computer 1530 may be under the ownership or control of a service provider, or may be operated by the service provider or on behalf of the service provider. The connections 1521, 1522 between the telecommunication network 1510 and the host computer 1530 may extend directly from the core network 1514 to the host computer 1530 or may go via an optional intermediate network 1520. The intermediate network 1520 may be one of, or a combination of more than one of, a public, private or hosted network; the intermediate network 1520, if any, may be a backbone network or the Internet; in particular, the intermediate network 1520 may comprise two or more sub-networks (not shown).

The communication system 1500 of FIG. 15 as a whole enables connectivity between one of the connected UEs 1591, 1592 and the host computer 1530. The connectivity may be described as an over-the-top (OTT) connection 1550. The host computer 1530 and the connected UEs 1591, 1592 are configured to communicate data and/or signaling via the OTT connection 1550, using the access network 1511, the core network 1514, any intermediate network 1520 and possible further infrastructure (not shown) as intermediaries, e.g., in the step 208. The OTT connection 1550 may be transparent in the sense that the participating communication devices through which the OTT connection 1550 passes are unaware of routing of uplink and downlink communications. For example, a base station 1512 may not or need not be informed about the past routing of an incoming downlink communication with data originating from a host computer 1530 to be forwarded (e.g., handed over) to a connected UE 1591, e.g., in the step 208. Similarly, the base station 1512 need not be aware of the future routing of an outgoing uplink communication originating from the UE 1591 towards the host computer 1530.

Example implementations, in accordance with an embodiment, of the UE, base station and host computer discussed in the preceding paragraphs will now be described with reference to FIG. 16. In a communication system 1600, a host computer 1610 comprises hardware 1615 including a communication interface 1616 configured to set up and maintain a wired or wireless connection with an interface of a different communication device of the communication system 1600. The host computer 1610 further comprises processing circuitry 1618, which may have storage and/or processing capabilities. In particular, the processing circuitry 1618 may comprise one or more programmable processors, application-specific integrated circuits, field programmable gate arrays or combinations of these (not shown) adapted to execute instructions. The host computer 1610 further comprises software 1611, which is stored in or accessible by the host computer 1610 and executable by the processing circuitry 1618. The software 1611 includes a host application 1612. The host application 1612 may be operable to provide a service to a remote user, such as a UE 1630 connecting via an OTT connection 1650 terminating at the UE 1630 and the host computer 1610. In providing the service to the remote user, the host application 1612 may provide user data which is transmitted using the OTT connection 1650.

The communication system 1600 further includes a base station 1620 provided in a telecommunication system and comprising hardware 1625 enabling it to communicate with the host computer 1610 and with the UE 1630. The hardware 1625 may include a communication interface 1626 for setting up and maintaining a wired or wireless connection with an interface of a different communication device of the communication system 1600, as well as a radio interface 1627 for setting up and maintaining at least a wireless connection 1670 with a UE 1630 located in a coverage area (not shown in FIG. 16) served by the base station 1620. The communication interface 1626 may be configured to facilitate a connection 1660 to the host computer 1610. The connection 1660 may be direct or it may pass through a core network (not shown in FIG. 16) of the telecommunication system and/or through one or more intermediate networks outside the telecommunication system. In the embodiment shown, the hardware 1625 of the base station 1620 further includes processing circuitry 1628, which may comprise one or more programmable processors, application-specific integrated circuits, field programmable gate arrays or combinations of these (not shown) adapted to execute instructions. The base station 1620 further has software 1621 stored internally or accessible via an external connection.

The communication system 1600 further includes the UE 1630 already referred to. Its hardware 1635 may include a radio interface 1637 configured to set up and maintain a wireless connection 1670 with a base station serving a coverage area in which the UE 1630 is currently located. The hardware 1635 of the UE 1630 further includes processing circuitry 1638, which may comprise one or more programmable processors, application-specific integrated circuits, field programmable gate arrays or combinations of these (not shown) adapted to execute instructions. The UE 1630 further comprises software 1631, which is stored in or accessible by the UE 1630 and executable by the processing circuitry 1638. The software 1631 includes a client application 1632. The client application 1632 may be operable to provide a service to a human or non-human user via the UE 1630, with the support of the host computer 1610. In the host computer 1610, an executing host application 1612 may communicate with the executing client application 1632 via the OTT connection 1650 terminating at the UE 1630 and the host computer 1610. In providing the service to the user, the client application 1632 may receive request data from the host application 1612 and provide user data in response to the request data. The OTT connection 1650 may transfer both the request data and the user data. The client application 1632 may interact with the user to generate the user data that it provides.

Figure 16:
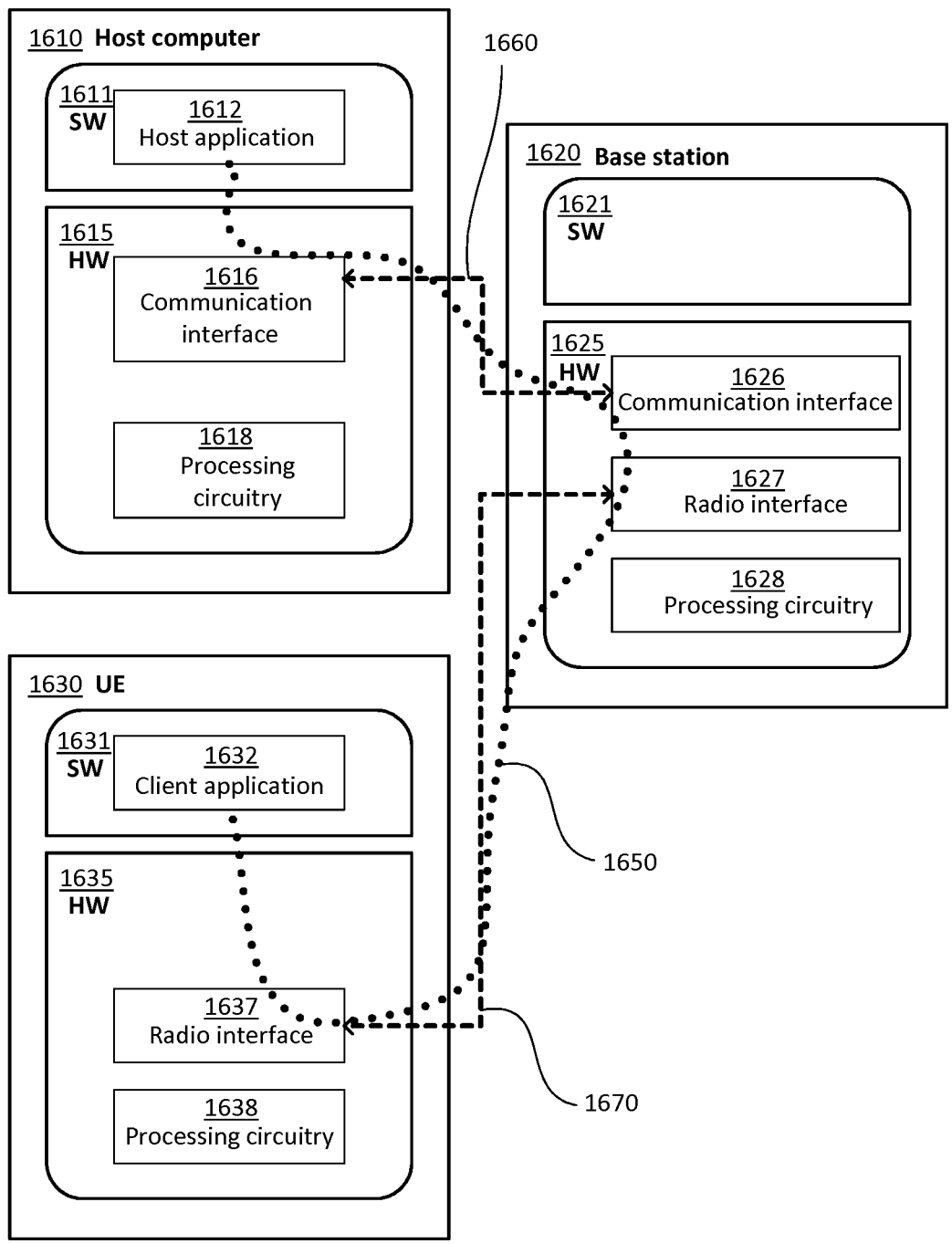
FIG. 16 shows a generalized block diagram of an embodiment of a host computer communicating via a base station with a user equipment over a partially wireless connection.

It is noted that the host computer 1610, base station 1620 and UE 1630 illustrated in FIG. 16 may be identical to the host computer 1530, one of the base stations 1512*a*, 1512*b*, 1512*c* and one of the UEs 1591, 1592 of FIG. 15, respectively. This is to say, the inner workings of these entities may be as shown in FIG. 16 and independently, the surrounding network topology may be that of FIG. 15.

In FIG. 16, the OTT connection 1650 has been drawn abstractly to illustrate the communication between the host computer 1610 and the use equipment 1630 via the base station 1620, without explicit reference to any intermediary devices and the precise routing of messages via these devices. Network infrastructure may determine the routing, which it may be configured to hide from the UE 1630 or from the service provider operating the host computer 1610, or both. While the OTT connection 1650 is active, the network infrastructure may further take decisions by which it dynamically changes the routing (e.g., on the basis of load balancing consideration or reconfiguration of the network).

The wireless connection 1670 between the UE 1630 and the base station 1620 is in accordance with the teachings of the embodiments described throughout this disclosure. One or more of the various embodiments improve the performance of OTT services provided to the UE 1630 using the OTT connection 1650, in which the wireless connection 1670 forms the last segment. More precisely, the teachings of these embodiments may reduce the latency and improve the data rate and thereby provide benefits such as better responsiveness.

A measurement procedure may be provided for the purpose of monitoring data rate, latency and other factors on which the one or more embodiments improve. There may further be an optional network functionality for reconfiguring the OTT connection 1650 between the host computer 1610 and UE 1630, in response to variations in the measurement results. The measurement procedure and/or the network functionality for reconfiguring the OTT connection 1650 may be implemented in the software 1611 of the host computer 1610 or in the software 1631 of the UE 1630, or both. In embodiments, sensors (not shown) may be deployed in or in association with communication devices through which the OTT connection 1650 passes; the sensors may participate in the measurement procedure by supplying values of the monitored quantities exemplified above, or supplying values of other physical quantities from which software 1611, 1631 may compute or estimate the monitored quantities. The reconfiguring of the OTT connection 1650 may include message format, retransmission settings, preferred routing etc.; the reconfiguring need not affect the base station 1620, and it may be unknown or imperceptible to the base station 1620. Such procedures and functionalities may be known and practiced in the art. In certain embodiments, measurements may involve proprietary UE signaling facilitating the host computer's 1610 measurements of throughput, propagation times, latency and the like. The measurements may be implemented in that the software 1611, 1631 causes messages to be transmitted, in particular empty or "dummy" messages, using the OTT connection 1650 while it monitors propagation times, errors etc.

Figures 17, 18:
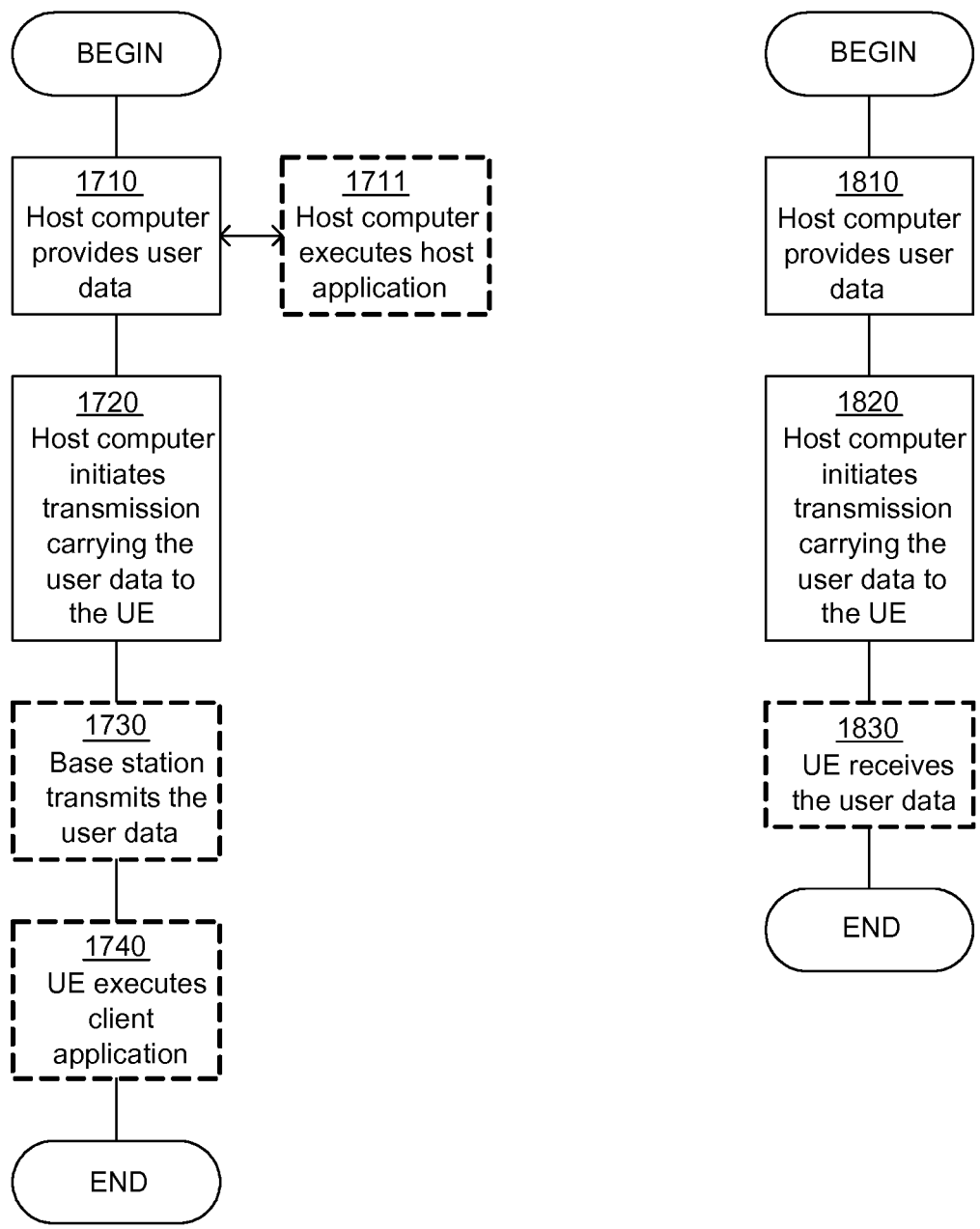
FIGS. 17 and 18 show flowcharts for methods implemented in a communication system including a host computer, a base station and a user equipment.

FIG. 17 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 15 will be included in this section. In a first step 1710 of the method, the host computer provides user data. In an optional substep 1711 of the first step 1710, the host computer provides the user data by executing a host application. In a second step 1720, the host computer initiates a transmission carrying the user data to the UE. In an optional third step 1730, the base station transmits to the UE the user data which was carried in the transmission that the host computer initiated, in accordance with the teachings of the embodiments described throughout this disclosure. In an optional fourth step 1740, the UE executes a client application associated with the host application executed by the host computer.

FIG. 18 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 18 will be included in this section. In a first step 1810 of the method, the host computer provides user data. In an optional substep (not shown) the host computer provides the user data by executing a host application. In a second step 1820, the host computer initiates a transmission carrying the user data to the UE. The transmission may pass via the base station, in accordance with the teachings of the embodiments described throughout this disclosure. In an optional third step 1830, the UE receives the user data carried in the transmission.

In any embodiment and in any implementation, a mismatch between a constructed channel (e.g., a precoder based on an extended channel state for a MIMO channel) and real channel (e.g., a hypothetical precoder based on full knowledge of the channel state for the MIMO channel) may be acknowledged and/or taken into account for selecting a transport format for the MIMO channel. The selection may be based on a metric that is corrected to take into account how the mismatch may impact the transport format selection. In contrast with regular channel knowledge errors, errors introduced by the channel construction (e.g., errors caused by the mismatch) may be very different between the layers of the MIMO channel. Embodiments allow handling and/or correcting the layer separately, e.g., by means of layer-specific offsets. Furthermore, without an explicit correction, the error introduced by the channel construction may be unknown at a transmitter of the MIMO channel and/or may cause a failure in the selection of the transport format.

As has become apparent from above description, embodiments of the technique allow selecting a transport format (e.g., a rank, a modulation scheme and/or a coding scheme) that matches the actual channel quality more closely the selection includes a channel state that is constructed from a partial channel state. By evaluating the metric for both the partial channel state and the extended channel state, the selection of the transport format (e.g., a rank adaptation) can work properly in a wider range of channel qualities, particularly if the extended channel state is used to derive a MIMO precoder.

Same or further embodiments can avoid an overestimation of the extended channel state (e.g., the metric for the MIMO precoder derived from the extended channel state) by offsetting the metric underlying the selection and/or by offsetting a layer-specific channel quality underling the metric. The selection can reduce decoding errors due to a mismatch between the extended channel state that is constructed at a transmitter and an actual channel state that is not available at the transmitter.

Same or further embodiments can improving overall system capacity and/or reliability. Particularly, an overestimation in rank adaptation can be avoided.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A method of connecting a first station comprising M first antenna ports to a second station comprising N second antenna ports, wherein M≥2 and N≥2, the method comprising the steps of:
   performing a channel estimation based on reference signals received at the M first antenna ports from a subset comprising $X_0$ second antenna ports among the N second antenna ports, wherein $1 \leq X_0 < N \leq M$, resulting in a partial channel state relating the $X_0$ second antenna ports to the M first antenna ports;
   constructing at least one extended channel state based on the partial channel state, the i-th extended channel state relating $X_i$ second antenna ports among the N second antenna ports to the M first antenna ports, wherein i≥1 and $X_0 < X_i \leq N$;
   selecting a transport format, wherein the selection depends on a metric evaluated for each of the partial channel state and the at least one extended channel state, and
   transmitting data from the first station to the second station using the selected transport format.

2. The method of claim 1, wherein the metric depends on at least one of the transport format and a radio propagation environment of a multiple input multiple output (MIMO) channel.

3. The method of claim 1, wherein the transport format comprises a rank of a multiple input multiple output (MIMO) channel.

4. The method of claim 1, wherein the metric comprises at least one of a mutual information, a channel capacity and a data rate for a multiple input multiple output (MIMO) channel.

5. The method of claim 1, wherein the partial channel state corresponds to a rank $r_0$ and each of the at least one extended channel state corresponds to a rank $r_i$, wherein $r_i \leq X_i$ for i≥0.

6. The method of claim 1, wherein the selection of the transport format comprises the step of:
   determining, for each of the partial channel state and the at least one extended channel state, at least one precoder for $r_i$ layers of a multiple input multiple output (MIMO) channel, wherein $r_i$ is the rank of the at least one precoder.

7. The method of claim 6, wherein the evaluation of the metric comprises the step of:
   evaluating a channel quality for each of the layers.

8. The method of claim 7, wherein the evaluation of the metric for each of the at least one extended channel state further comprises the step of:
   offsetting the evaluated channel quality for at least one or each of the layers by an offset.

9. The method of claim 8, wherein the offset for the at least one or each of the layers of the respective precoder depends on the radio propagation environment of the MIMO channel.

10. The method of claim 8, wherein the offsets for different layers of the same precoder are different.

11. The method of claim 8, wherein the channel quality comprises at least one of a signal to noise ratio, SNR, of the respective layer and a signal to interference plus noise ratio, SINR, of the respective layer.

12. The method of claim 8, wherein the evaluation of the metric further comprises the step of:
converting the offset channel quality for each of the layers to an additive metric for each of the layers.

13. The method of claim 12, wherein the additive metric comprises at least one of a mutual information of the respective layer, a channel capacity of the respective layer and a data rate of the respective layer.

14. The method of claim 12, wherein the evaluation of the metric further comprises the step of:
aggregating, for each of the at least one precoder, the additive metrics for the layers of the respective precoder.

15. The method of claim 8, wherein each of the at least one precoders is determined based on the respective channel state according to a precoding type, and wherein the offset for the at least one or each of the layers of a respective precoder depends on the precoding type.

16. The method of claim 15, wherein the precoding type comprises at least one of matched filter, MF; singular value decomposition, SVD; eigenvalue based beamforming, EBB; maximum ratio transmission, MRT; zero-forcing, ZF; and Wiener filter, WF.

17. The method of claim 8, wherein each of the at least one extended channel state is constructed according to a constructing type, and wherein the offsets for the layers determined for the respective extended channel state depend on the constructing type.

18. The method of claim 8, wherein the offsets for the layers are determined for the respective extended channel state depending on the number M of first antenna ports.

19. A first station comprising M first antenna ports adapted to connect to a second station comprising N second antenna ports, wherein $M \geq 2$ and $N \geq 2$, the first station comprising at least one processor and a memory, said memory comprising instructions executable by said at least one processor, whereby the first station is operative to:
perform a channel estimation based on reference signals received at the M first antenna ports from a subset comprising $X_0$ second antenna ports among the N second antenna ports, wherein $1 \leq X_0 < N \leq M$, resulting in a partial channel state relating the $X_0$ second antenna ports to the M first antenna ports;
construct at least one extended channel state based on the partial channel state, the i-th extended channel state relating $X_i$ second antenna ports among the N second antenna ports to the M first antenna ports, wherein $i \geq 1$ and $X_0 < X_i \leq N$; and
select a transport format, wherein the selection depends on a metric evaluated for each of the partial channel state and the at least one extended channel state, and transmit data to the second station using the selected transport format.

* * * * *